(12) United States Patent
Mishaeli et al.

(10) Patent No.: US 9,501,132 B2
(45) Date of Patent: Nov. 22, 2016

(54) INSTRUCTION AND LOGIC FOR STORE BROADCAST AND POWER MANAGEMENT

(71) Applicant: Intel Corporation, Santa Clara, CA (US)

(72) Inventors: Michael Mishaeli, Zichron Yaakov (IL); Stanislav Shwartsman, Haifa (IL); Gal Ofir, Atzmon (IL); Yulia Kurolap, Haifa (IL)

(73) Assignee: Intel Corporation, Santa Clara, CA (US)

( * ) Notice: Subject to any disclaimer, the term of this patent is extended or adjusted under 35 U.S.C. 154(b) by 271 days.

(21) Appl. No.: 14/453,341

(22) Filed: Aug. 6, 2014

(65) Prior Publication Data

US 2016/0041945 A1 Feb. 11, 2016

(51) Int. Cl.
*G06F 1/32* (2006.01)
*G06F 9/30* (2006.01)
*G06F 15/78* (2006.01)

(52) U.S. Cl.
CPC ............... *G06F 1/3287* (2013.01); *G06F 1/32* (2013.01); *G06F 9/30145* (2013.01); *G06F 15/7807* (2013.01)

(58) Field of Classification Search
CPC .................................................... G06F 1/3287
See application file for complete search history.

(56) References Cited

U.S. PATENT DOCUMENTS

| 5,598,568 | A * | 1/1997 | Frisch | G06F 13/1657 712/29 |
| 8,572,412 | B1 * | 10/2013 | Solt | G06F 1/206 702/132 |
| 2004/0160123 | A1 * | 8/2004 | Burdick | B60D 1/62 307/10.1 |
| 2008/0104425 | A1 * | 5/2008 | Gunther | G06F 1/3203 713/300 |

* cited by examiner

*Primary Examiner* — William B Partridge
(74) *Attorney, Agent, or Firm* — Baker Botts L.L.P.

(57) ABSTRACT

A processor includes a core with locally-gated circuitry, a decode unit, a local power gate (LPG) coupled to the locally-gated circuitry, and an execution unit. The decode unit includes logic to decode a store broadcast instruction of a specified width. The LPG includes logic to selectively provide power to the locally-gated circuitry, activate power to a first portion of the locally-gated circuitry for execution of full cache-line memory operations, and deactivate power to a second portion of the locally-gated circuitry the locally-gated circuitry. The execution unit includes logic to execute, by the first portion of the locally-gated circuitry for execution of full cache-line memory operations, the store broadcast instruction, the store broadcast instruction to store data of the specified width to storage of the processor.

20 Claims, 29 Drawing Sheets

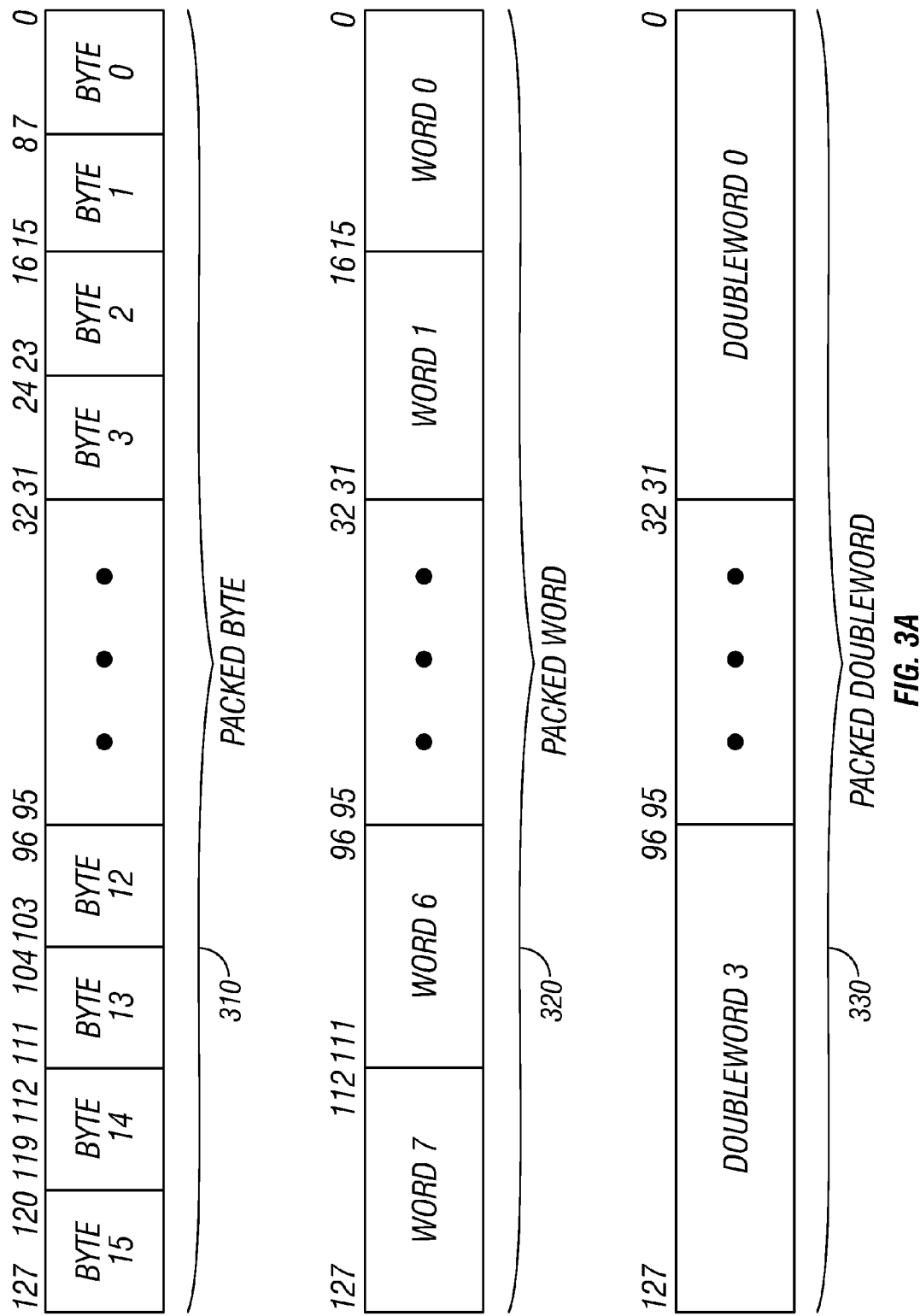

| 127 | 120 119 | 112 111 | 104 103 | | 24 23 | 16 15 | 8 7 | 0 |
|---|---|---|---|---|---|---|---|---|
| bbbb bbbb | bbbb bbbb | bbbb bbbb | | • • • | bbbb bbbb | bbbb bbbb | bbbb bbbb |

UNSIGNED PACKED BYTE REPRESENTATION 344

| 127 | 120 119 | 112 111 | 104 103 | | 24 23 | 16 15 | 8 7 | 0 |
|---|---|---|---|---|---|---|---|---|
| sbbb bbbb | sbbb bbbb | sbbb bbbb | | • • • | sbbb bbbb | sbbb bbbb | sbbb bbbb |

SIGNED PACKED BYTE REPRESENTATION 345

| 127 | 112 111 | | 16 15 | 0 |
|---|---|---|---|---|
| wwww wwww wwww wwww | | • • • | wwww wwww wwww wwww |

UNSIGNED PACKED WORD REPRESENTATION 346

| 127 | 112 111 | | 16 15 | 0 |
|---|---|---|---|---|
| swww wwww wwww wwww | | • • • | swww wwww wwww wwww |

SIGNED PACKED WORD REPRESENTATION 347

| 127 | | 92 91 | 32 31 | 0 |
|---|---|---|---|---|
| dddd dddd dddd dddd dddd dddd dddd dddd | • • • | dddd dddd dddd dddd dddd dddd dddd dddd |

UNSIGNED PACKED DOUBLEWORD REPRESENTATION 348

| 127 | | 92 91 | 32 31 | 0 |
|---|---|---|---|---|
| sddd dddd dddd dddd dddd dddd dddd dddd | • • • | sddd dddd dddd dddd dddd dddd dddd dddd |

SIGNED PACKED DOUBLEWORD REPRESENTATION 349

FIG. 3C

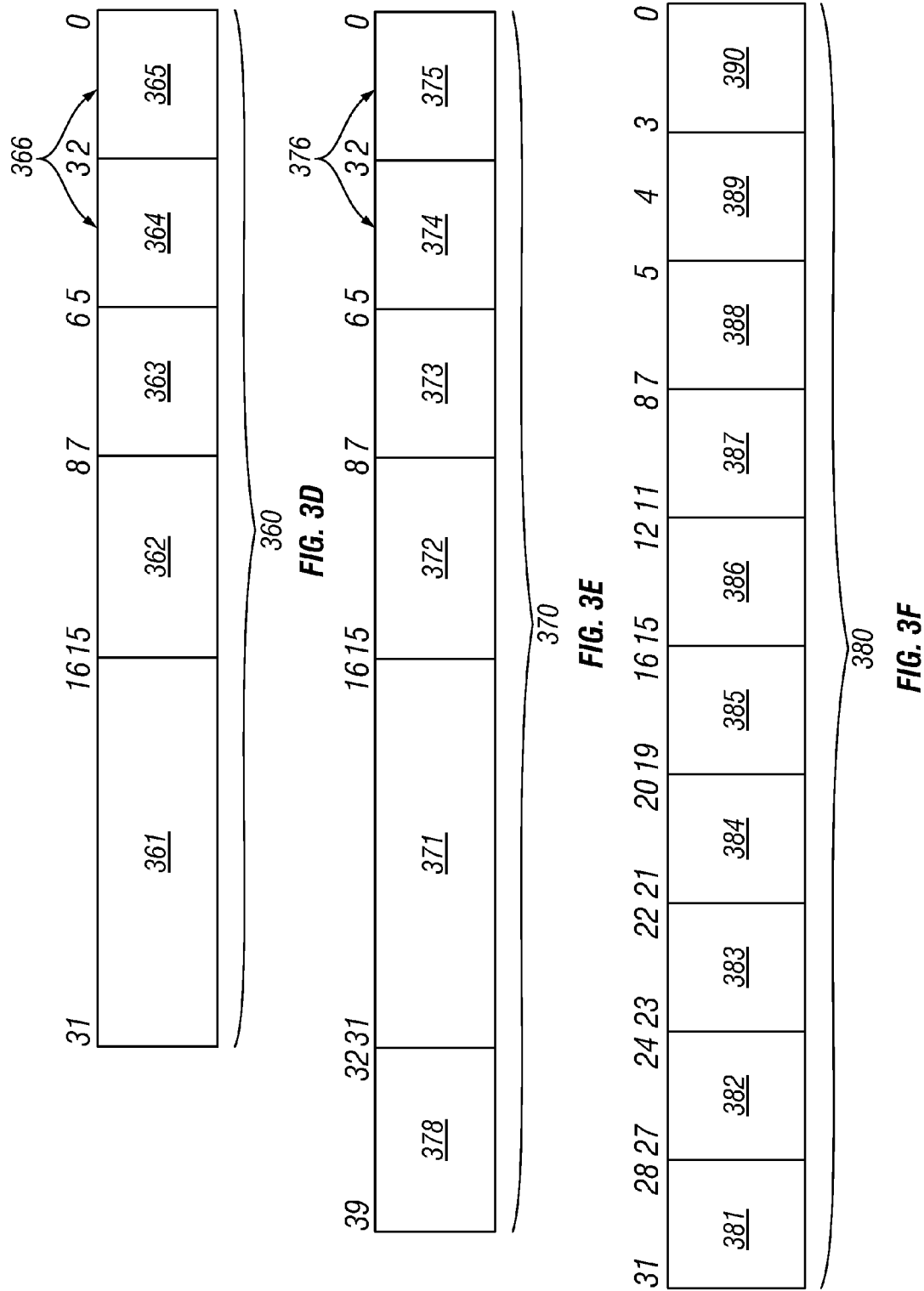

REP STOS (N-bits of data) to ADDR1

Store_broadcast (ADDR1, DATA)

DATA: | 0 | 1 | ... | N-1 |    N: 64*x+y

⇩

(1) Store_broadcast_64_to_cache_line (ADDR1, DATA[0, 63])
    (Store the first 64 bits)

(2) Store_broadcast_64_to_cache_line (ADDR1, DATA[64, 127])
    (Store the next 64 bits)

...

(x) Store_broadcast_64_to_cache_line (ADDR1, DATA[64*(x-1), 64*x-1])
    (Store the last complete 64 bits)

(x+1) Store_broadcast_with_mask (constant-1(N-1-64*x) append constant-0(64*(x+1)-1-N), ADDR1, DATA[64*x, 64*(x+1)-1])
    (Store the trailing bits of the data by creating a mask and applying it to the next 64 bits)

FIG. 21

INSTRUCTION AND LOGIC FOR STORE BROADCAST AND POWER MANAGEMENT

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Multiprocessor systems are becoming more and more common. Applications of multiprocessor systems include dynamic domain partitioning all the way down to desktop computing. In order to take advantage of multiprocessor systems, code to be executed may be separated into multiple threads for execution by various processing entities. Each thread may be executed in parallel with one another. Furthermore, in order to increase the utility of a processing entity, out-of-order execution may be employed. Out-of-order execution may execute instructions as input to such instructions is made available. Thus, an instruction that appears later in a code sequence may be executed before an instruction appearing earlier in a code sequence.

DESCRIPTION OF THE FIGURES

Embodiments are illustrated by way of example and not limitation in the Figures of the accompanying drawings:

FIG. 3A illustrates various packed data type representations in multimedia registers, in accordance with embodiments of the present disclosure;

FIG. 3C illustrates various signed and unsigned packed data type representations in multimedia registers, in accordance with embodiments of the present disclosure;

FIG. 3D illustrates an embodiment of an operation encoding format;

FIG. 3E illustrates another possible operation encoding format having forty or more bits, in accordance with embodiments of the present disclosure;

FIG. 3F illustrates yet another possible operation encoding format, in accordance with embodiments of the present disclosure;

FIG. 21 is an illustration of example operation of system to execute store operations, in accordance with embodiments of the present disclosure.

DETAILED DESCRIPTION

Figure 1A:
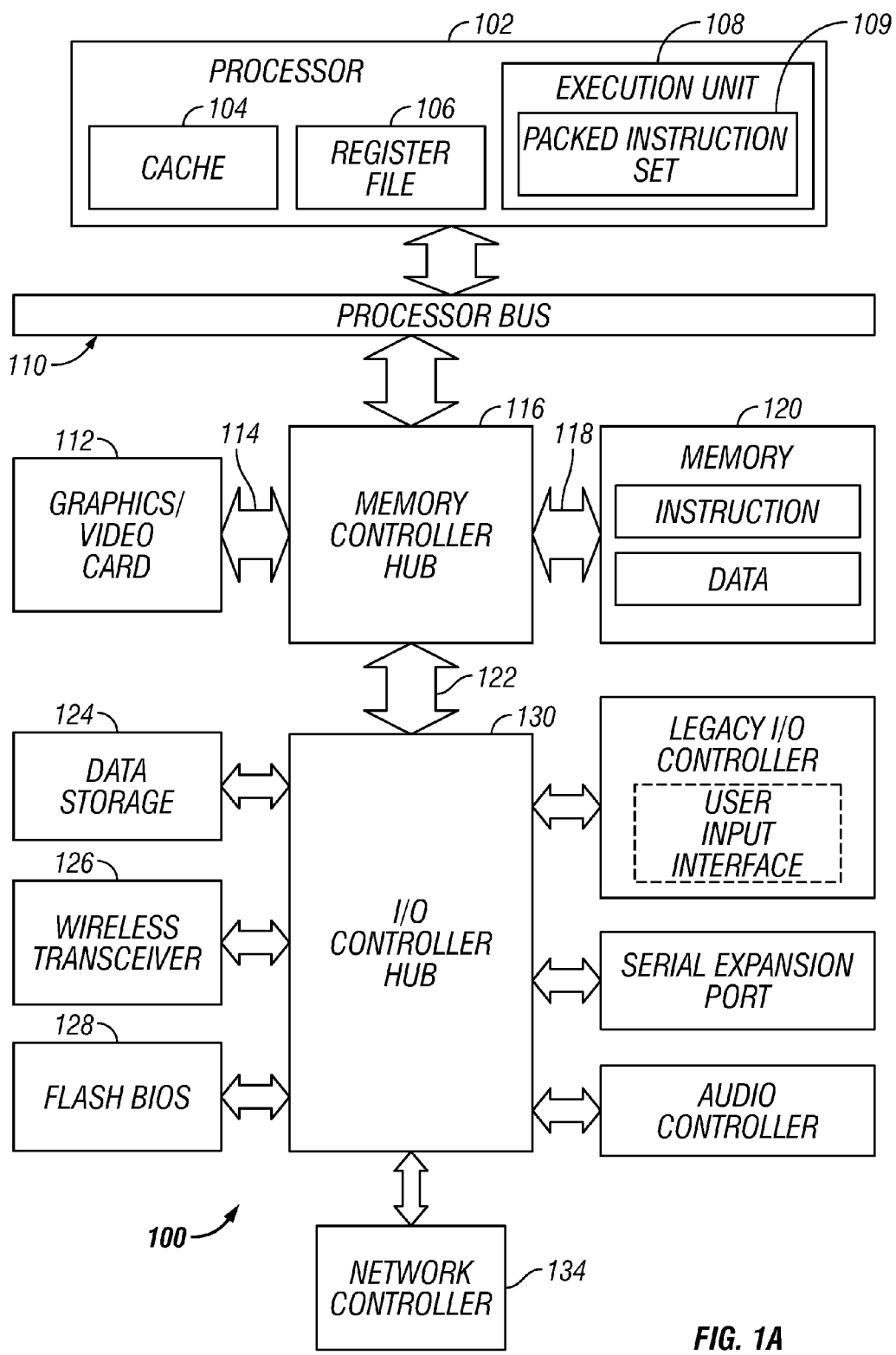
FIG. 1A is a block diagram of an exemplary computer system formed with a processor that may include execution units to execute an instruction, in accordance with embodiments of the present disclosure.

The following description describes an instruction and processing logic for store broadcast within or in association with a processor, virtual processor, package, computer system, or other processing apparatus. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that the embodiments may be practiced without such specific details. Additionally, some well-known structures, circuits, and the like have not been shown in detail to avoid unnecessarily obscuring embodiments of the present disclosure.

Although the following embodiments are described with reference to a processor, other embodiments are applicable to other types of integrated circuits and logic devices. Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that performs data manipulations. However, the embodiments are not limited to processors or machines that perform 512-bit, 256-bit, 128-bit, 64-bit, 32-bit, or 16-bit data operations and may be applied to any processor and machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that may be programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, steps of embodiments of the present disclosure might be performed by specific hardware components that contain fixed-function logic for performing the steps, or by any combination of programmed computer components and fixed-function hardware components.

Instructions used to program logic to perform embodiments of the present disclosure may be stored within a memory in the system, such as DRAM, cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Discs, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store on a tangible, machine-readable medium, at least temporarily, an article, such as information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel® Pentium 4 processors, Intel® Core™ processors, and processors from Advanced Micro Devices, Inc. of Sunnyvale, Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed. In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that may include execution units to execute an instruction, in accordance with embodiments of the present disclosure. System 100 may include a component, such as a processor 102 to employ execution units including logic to perform algorithms for process data, in accordance with the present disclosure, such as in the embodiment described herein. System 100 may be representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer register.

Execution unit 108, including logic to perform integer and floating point operations, also resides in processor 102. Processor 102 may also include a microcode (ucode) ROM that stores microcode for certain macroinstructions. In one embodiment, execution unit 108 may include logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Embodiments of an execution unit 108 may also be used in micro controllers, embedded processors, graphics devices, DSPs, and other types of logic circuits. System 100 may include a memory 120. Memory 120 may be implemented as a Dynamic Random Access Memory (DRAM) device, a Static Random Access Memory (SRAM) device, flash memory device, or other memory device. Memory 120 may store instructions and/or data represented by data signals that may be executed by processor 102.

A system logic chip 116 may be coupled to processor bus 110 and memory 120. System logic chip 116 may include a memory controller hub (MCH). Processor 102 may communicate with MCH 116 via a processor bus 110. MCH 116 may provide a high bandwidth memory path 118 to memory 120 for instruction and data storage and for storage of graphics commands, data and textures. MCH 116 may direct data signals between processor 102, memory 120, and other components in system 100 and to bridge the data signals between processor bus 110, memory 120, and system I/O 122. In some embodiments, the system logic chip 116 may provide a graphics port for coupling to a graphics controller 112. MCH 116 may be coupled to memory 120 through a memory interface 118. Graphics card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, chipset, and processor 102. Examples may include the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. Data storage device 124 may comprise a hard disk drive, a floppy disk drive, a CD-ROM device, a flash memory device, or other mass storage device.

For another embodiment of a system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Figure 1B:
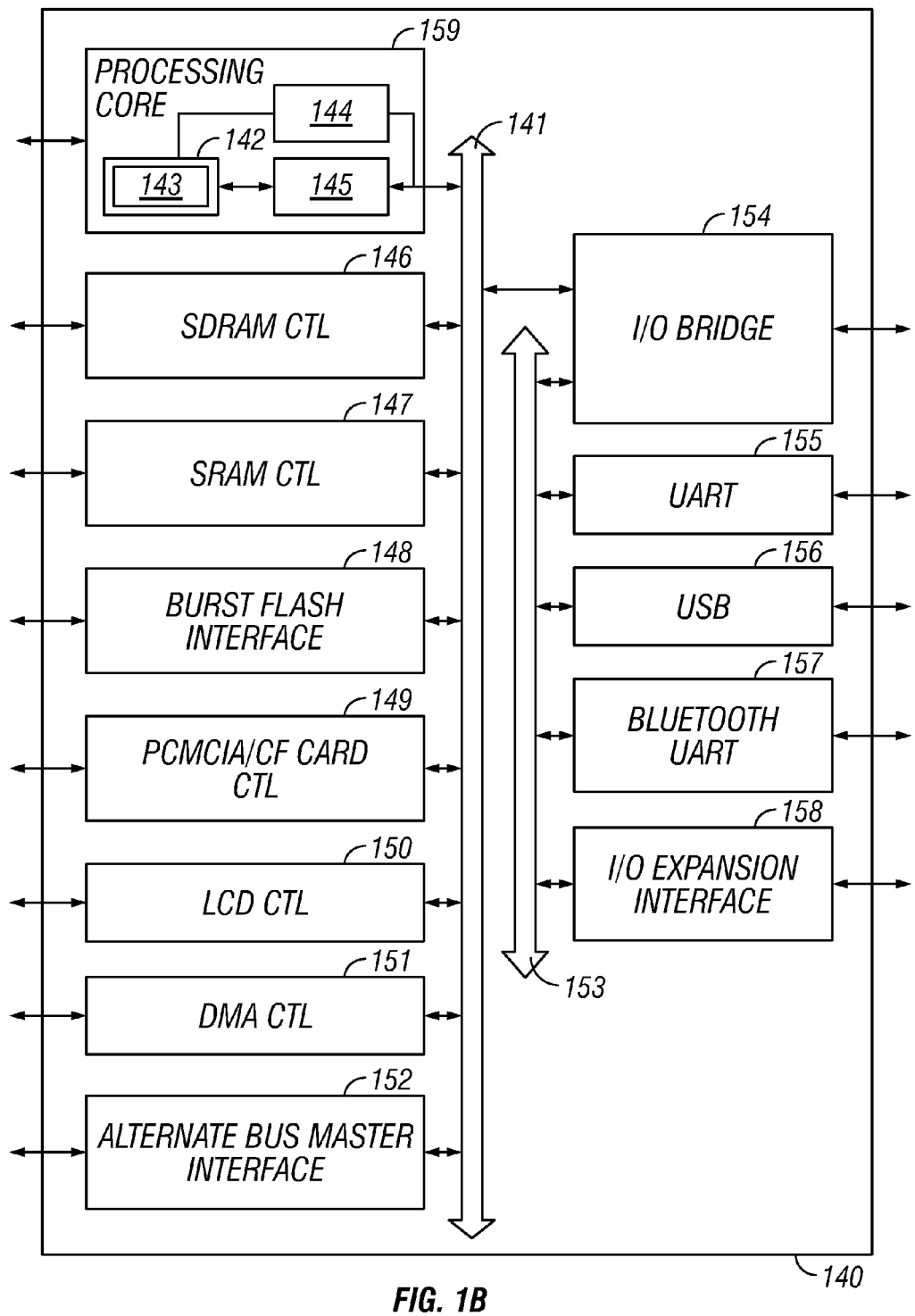
FIG. 1B illustrates a data processing system, in accordance with embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW-type architecture. Processing core 159 may also be suitable for manufacture in one or more process technologies and by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. As previously mentioned, it is understood that the storage area may store the packed data might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, Synchronous Dynamic Random Access Memory (SDRAM) control 146, Static Random Access Memory (SRAM) control 147, burst flash memory interface 148, Personal Computer Memory Card International Association (PCMCIA)/Compact Flash (CF) card control 149, Liquid Crystal Display (LCD) control 150, Direct Memory Access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, Universal Asynchronous Receiver/Transmitter (UART) 155, Universal Serial Bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
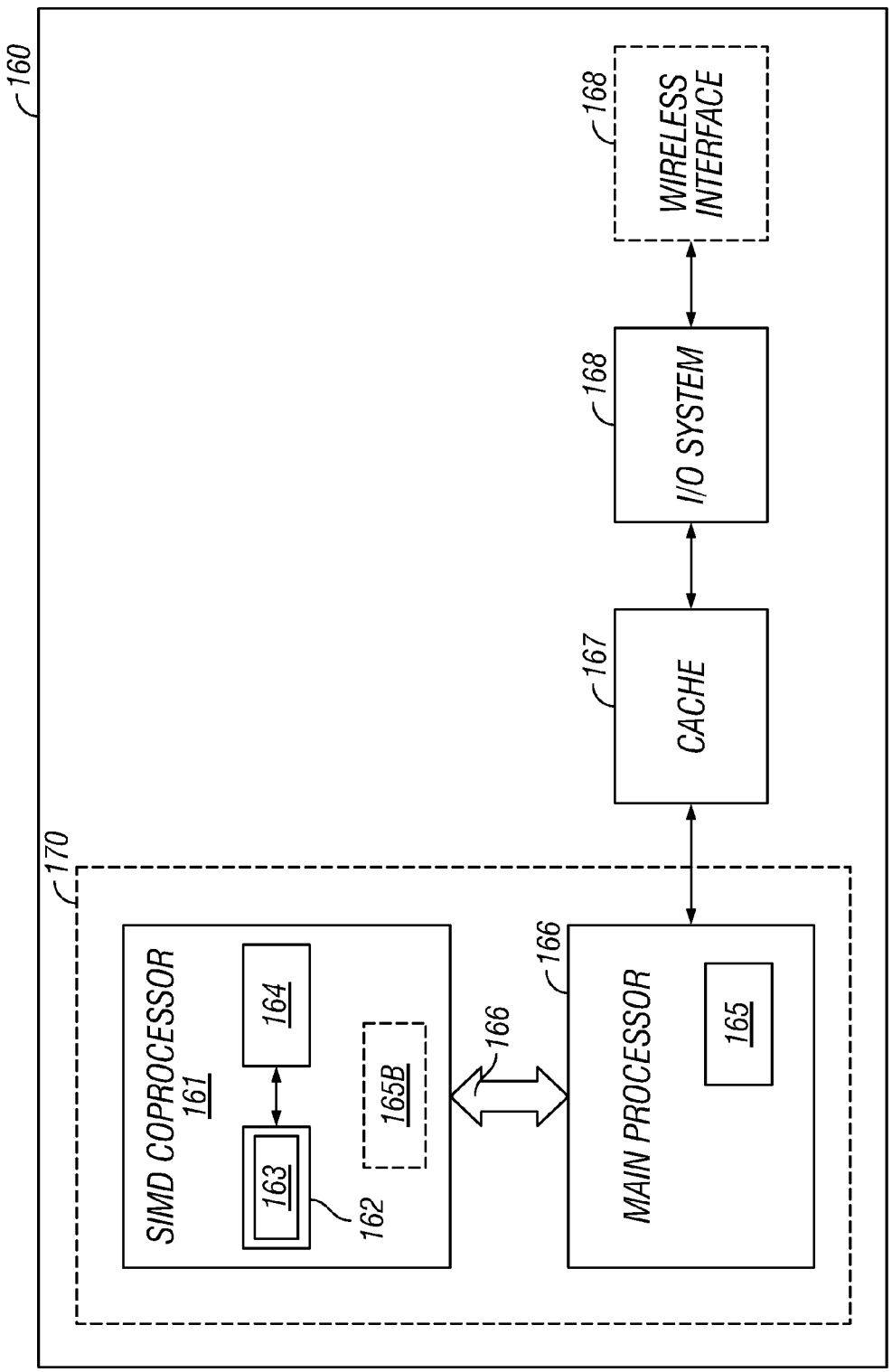
FIG. 1C illustrates other embodiments of a data processing system for performing text string comparison operations.

FIG. 1C illustrates other embodiments of a data processing system that performs SIMD text string comparison operations. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations including instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 165 comprises a decoder 165 to recognize instructions of instruction set 163 including instructions in accordance with one embodiment for execution by execution unit 162. In other embodiments, SIMD coprocessor 161 also comprises at least part of decoder 165 to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165 of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 166. From coprocessor bus 166, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

Figure 2:
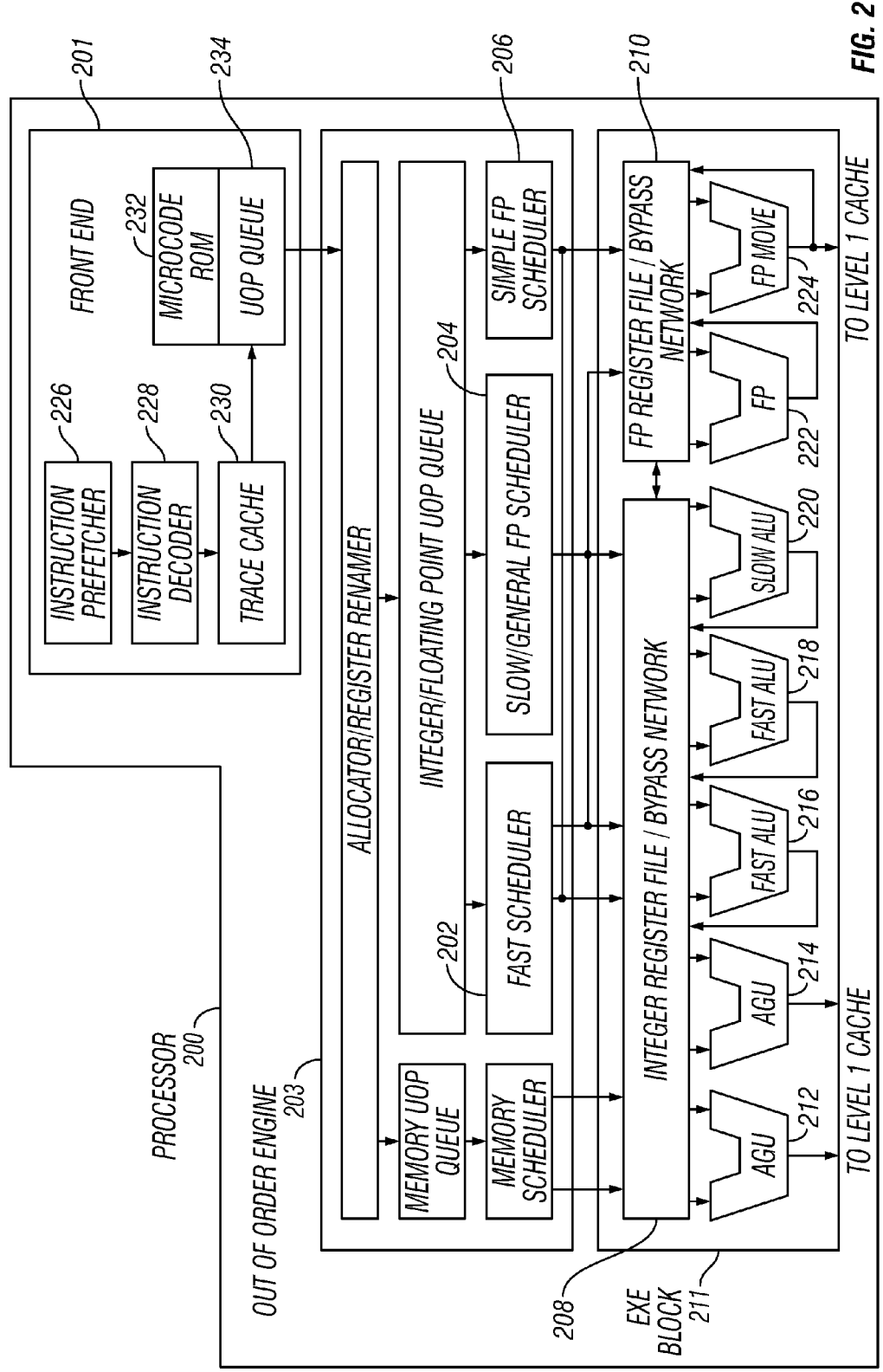
FIG. 2 is a block diagram of the micro-architecture for a processor that may include logic circuits to perform instructions, in accordance with embodiments of the present disclosure.

FIG. 2 is a block diagram of the micro-architecture for a processor 200 that may include logic circuits to perform instructions, in accordance with embodiments of the present disclosure. In some embodiments, an instruction in accordance with one embodiment may be implemented to operate on data elements having sizes of byte, word, doubleword, quadword, etc., as well as datatypes, such as single and double precision integer and floating point datatypes. In one embodiment, in-order front end 201 may implement a part of processor 200 that may fetch instructions to be executed and prepares the instructions to be used later in the processor pipeline. Front end 201 may include several units. In one embodiment, instruction prefetcher 226 fetches instructions from memory and feeds the instructions to an instruction decoder 228 which in turn decodes or interprets the instructions. For example, in one embodiment, the decoder decodes a received instruction into one or more operations called "micro-instructions" or "micro-operations" (also called micro op or uops) that the machine may execute. In other embodiments, the decoder parses the instruction into an opcode and corresponding data and control fields that may be used by the micro-architecture to perform operations in accordance with one embodiment. In one embodiment, trace cache 230 may assemble decoded uops into program ordered sequences or traces in uop queue 234 for execution. When trace cache 230 encounters a complex instruction, microcode ROM 232 provides the uops needed to complete the operation.

Some instructions may be converted into a single micro-op, whereas others need several micro-ops to complete the full operation. In one embodiment, if more than four micro-ops are needed to complete an instruction, decoder 228 may access microcode ROM 232 to perform the instruction. In one embodiment, an instruction may be decoded into a small number of micro-ops for processing at instruction decoder 228. In another embodiment, an instruction may be stored within microcode ROM 232 should a number of micro-ops be needed to accomplish the operation. Trace cache 230 refers to an entry point programmable logic array (PLA) to determine a correct micro-instruction pointer for reading the micro-code sequences to complete one or more instructions in accordance with one embodiment from micro-code ROM 232. After microcode ROM 232 finishes sequencing micro-ops for an instruction, front end 201 of the machine may resume fetching micro-ops from trace cache 230.

Out-of-order execution engine 203 may prepare instructions for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. Uop schedulers 202, 204, 206, determine when a uop is ready to execute based on the readiness of their dependent input register operand sources and the availability of the execution resources the uops need to complete their operation. Fast scheduler 202 of one embodiment may schedule on each half of the main clock cycle while the other schedulers may only schedule once per main processor clock cycle. The schedulers arbitrate for the dispatch ports to schedule uops for execution.

Register files 208, 210 may be arranged between schedulers 202, 204, 206, and execution units 212, 214, 216, 218, 220, 222, 224 in execution block 211. Each of register files 208, 210 perform integer and floating point operations, respectively. Each register file 208, 210, may include a bypass network that may bypass or forward just completed results that have not yet been written into the register file to new dependent uops. Integer register file 208 and floating point register file 210 may communicate data with the other. In one embodiment, integer register file 208 may be split into two separate register files, one register file for low-order thirty-two bits of data and a second register file for high order thirty-two bits of data. Floating point register file 210 may include 128-bit wide entries because floating point instructions typically have operands from 64 to 128 bits in width.

Execution block 211 may contain execution units 212, 214, 216, 218, 220, 222, 224. Execution units 212, 214, 216, 218, 220, 222, 224 may execute the instructions. Execution block 211 may include register files 208, 210 that store the integer and floating point data operand values that the micro-instructions need to execute. In one embodiment, processor 200 may comprise a number of execution units: address generation unit (AGU) 212, AGU 214, fast Arithmetic Logic Unit (ALU) 216, fast ALU 218, slow ALU 220, floating point ALU 222, floating point move unit 224. In another embodiment, floating point execution blocks 222, 224, may execute floating point, MMX, SIMD, and SSE, or other operations. In yet another embodiment, floating point ALU 222 may include a 64-bit by 64-bit floating point divider to execute divide, square root, and remainder micro-ops. In various embodiments, instructions involving a floating point value may be handled with the floating point hardware. In one embodiment, ALU operations may be passed to high-speed ALU execution units 216, 218. High-speed ALUs 216, 218 may execute fast operations with an effective latency of half a clock cycle. In one embodiment, most complex integer operations go to slow ALU 220 as slow ALU 220 may include integer execution hardware for long-latency type of operations, such as a multiplier, shifts, flag logic, and branch processing. Memory load/store operations may be executed by AGUs 212, 214. In one embodiment, integer ALUs 216, 218, 220 may perform integer operations on 64-bit data operands. In other embodiments, ALUs 216, 218, 220 may be implemented to support a variety of data bit sizes including sixteen, thirty-two, 128, 256, etc. Similarly, floating point units 222, 224 may be implemented to support a range of operands having bits of various widths. In one embodiment, floating point units 222, 224, may operate on 128-bit wide packed data operands in conjunction with SIMD and multimedia instructions.

In one embodiment, uops schedulers 202, 204, 206, dispatch dependent operations before the parent load has finished executing. As uops may be speculatively scheduled and executed in processor 200, processor 200 may also include logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations might need to be replayed and the independent ones may be allowed to complete. The schedulers and replay mechanism of one embodiment of a processor may also be designed to catch instruction sequences for text string comparison operations.

The term "registers" may refer to the on-board processor storage locations that may be used as part of instructions to identify operands. In other words, registers may be those that may be usable from the outside of the processor (from a programmer's perspective). However, in some embodiments registers might not be limited to a particular type of circuit. Rather, a register may store data, provide data, and perform the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register file of one embodiment also contains eight multi-media SIMD registers for packed data. For the discussions below, the registers may be understood to be data registers designed to hold packed data, such as 64-bit wide MMX™ registers (also referred to as 'mm' registers in some instances) in microprocessors enabled with MMX technology from Intel Corporation of Santa Clara, Calif. These MMX registers, available in both integer and floating point forms, may operate with packed data elements that accompany SIMD and SSE instructions. Similarly, 128-bit wide XMM registers relating to SSE2, SSE3, SSE4, or beyond (referred to generically as "SSEx") technology may hold such packed data operands. In one embodiment, in storing packed data and integer data, the registers do not need to differentiate between the two data types. In one embodiment, integer and floating point may be contained in the same register file or different register files. Furthermore, in one embodiment, floating point and integer data may be stored in different registers or the same registers.

In the examples of the following figures, a number of data operands may be described. FIG. 3A illustrates various packed data type representations in multimedia registers, in accordance with embodiments of the present disclosure. FIG. 3A illustrates data types for a packed byte 310, a packed word 320, and a packed doubleword (dword) 330 for 128-bit wide operands. Packed byte format 310 of this example may be 128 bits long and contains sixteen packed byte data elements. A byte may be defined, for example, as eight bits of data. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement increases the storage efficiency of the processor. As well, with sixteen data elements accessed, one operation may now be performed on sixteen data elements in parallel.

Generally, a data element may include an individual piece of data that is stored in a single register or memory location with other data elements of the same length. In packed data sequences relating to SSEx technology, the number of data elements stored in a XMM register may be 128 bits divided by the length in bits of an individual data element. Similarly, in packed data sequences relating to MMX and SSE technology, the number of data elements stored in an MMX register may be 64 bits divided by the length in bits of an individual data element. Although the data types illustrated in FIG. 3A may be 128 bits long, embodiments of the present disclosure may also operate with 64-bit wide or other sized operands. Packed word format 320 of this example may be 128 bits long and contains eight packed word data elements. Each packed word contains sixteen bits of information. Packed doubleword format 330 of FIG. 3A may be 128 bits long and contains four packed doubleword data elements. Each packed doubleword data element contains thirty-two bits of information. A packed quadword may be 128 bits long and contain two packed quad-word data elements.

Figure 3B:
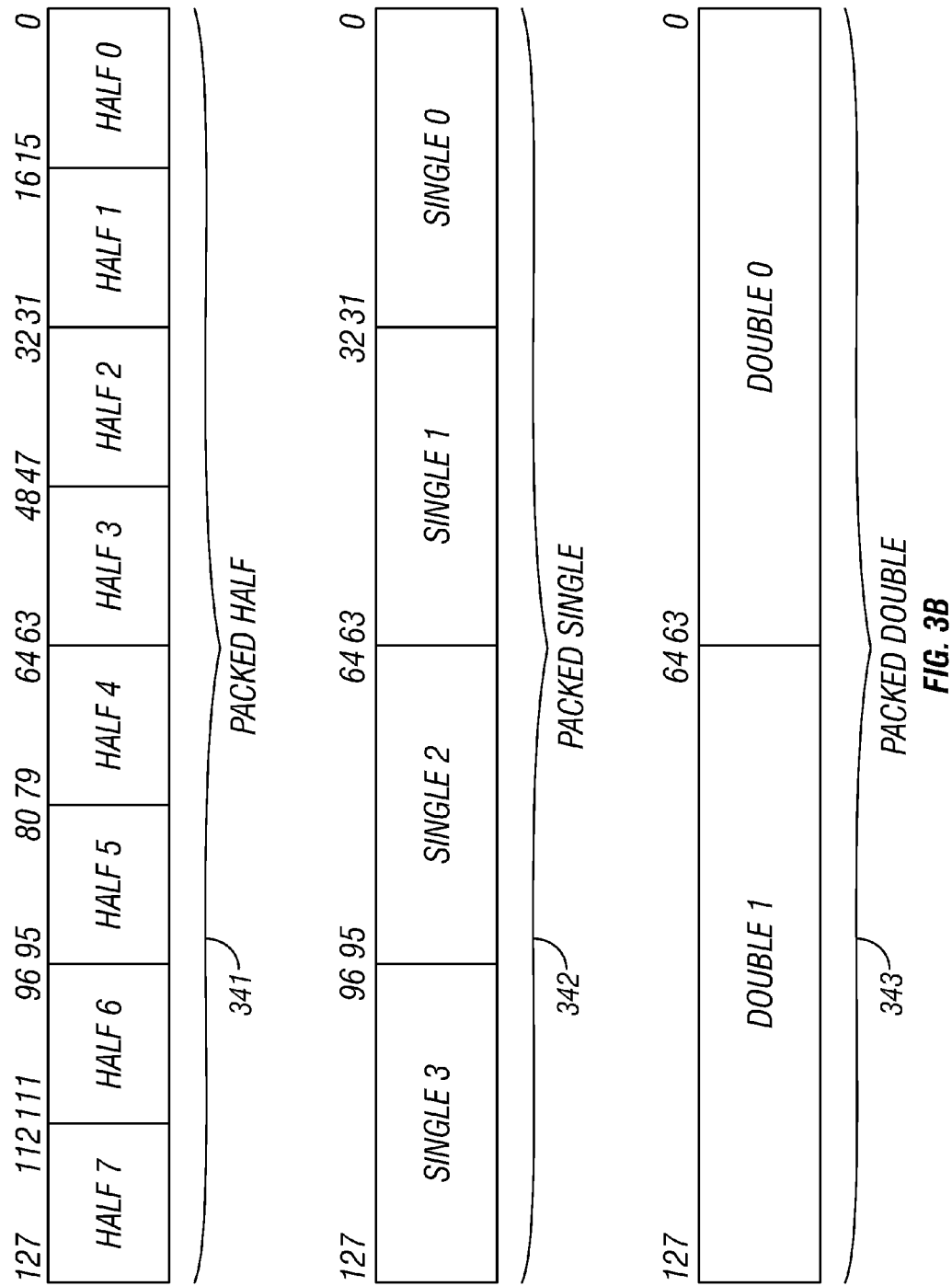
FIG. 3B illustrates possible in-register data storage formats, in accordance with embodiments of the present disclosure.

FIG. 3B illustrates possible in-register data storage formats, in accordance with embodiments of the present disclosure. Each packed data may include more than one independent data element. Three packed data formats are illustrated; packed half 341, packed single 342, and packed double 343. One embodiment of packed half 341, packed single 342, and packed double 343 contain fixed-point data elements. For another embodiment one or more of packed half 341, packed single 342, and packed double 343 may contain floating-point data elements. One embodiment of packed half 341 may be 128 bits long containing eight 16-bit data elements. One embodiment of packed single 342 may be 128 bits long and contains four 32-bit data elements. One embodiment of packed double 343 may be 128 bits long and contains two 64-bit data elements. It will be appreciated that such packed data formats may be further extended to other register lengths, for example, to 96-bits, 160-bits, 192-bits, 224-bits, 256-bits or more.

FIG. 3C illustrates various signed and unsigned packed data type representations in multimedia registers, in accordance with embodiments of the present disclosure. Unsigned packed byte representation 344 illustrates the storage of an unsigned packed byte in a SIMD register. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement may increase the storage efficiency of the processor. As well, with sixteen data elements accessed, one operation may now be performed on sixteen data elements in a parallel fashion. Signed packed byte representation 345 illustrates the storage of a signed packed byte. Note that the eighth bit of every byte data element may be the sign indicator. Unsigned packed word representation 346 illustrates how word seven through word zero may be stored in a SIMD register. Signed packed word representation 347 may be similar to the unsigned packed word in-register representation 346. Note that the sixteenth bit of each word data element may be the sign indicator. Unsigned packed doubleword representation 348 shows how doubleword data elements are stored. Signed packed doubleword representation 349 may be similar to unsigned packed doubleword in-register representation 348. Note that the necessary sign bit may be the thirty-second bit of each doubleword data element.

FIG. 3D illustrates an embodiment of an operation encoding (opcode). Furthermore, format 360 may include register/memory operand addressing modes corresponding with a type of opcode format described in the "IA-32 Intel Architecture Software Developer's Manual Volume 2: Instruction Set Reference," which is available from Intel Corporation, Santa Clara, Calif. on the world-wide-web (www) at intel.com/design/litcentr. In one embodiment, and instruction may be encoded by one or more of fields 361 and 362. Up to two operand locations per instruction may be identified, including up to two source operand identifiers 364 and 365. In one embodiment, destination operand identifier 366 may be the same as source operand identifier 364, whereas in other embodiments they may be different. In another embodiment, destination operand identifier 366 may be the same as source operand identifier 365, whereas in other embodiments they may be different. In one embodiment, one of the source operands identified by source operand identifiers 364 and 365 may be overwritten by the results of the text string comparison operations, whereas in other embodiments identifier 364 corresponds to a source register element and identifier 365 corresponds to a destination register element. In one embodiment, operand identifiers 364 and 365 may identify 32-bit or 64-bit source and destination operands.

FIG. 3E illustrates another possible operation encoding (opcode) format 370, having forty or more bits, in accordance with embodiments of the present disclosure. Opcode format 370 corresponds with opcode format 360 and comprises an optional prefix byte 378. An instruction according to one embodiment may be encoded by one or more of fields 378, 371, and 372. Up to two operand locations per instruction may be identified by source operand identifiers 374 and 375 and by prefix byte 378. In one embodiment, prefix byte 378 may be used to identify 32-bit or 64-bit source and destination operands. In one embodiment, destination operand identifier 376 may be the same as source operand identifier 374, whereas in other embodiments they may be different. For another embodiment, destination operand identifier 376 may be the same as source operand identifier 375, whereas in other embodiments they may be different. In one embodiment, an instruction operates on one or more of the operands identified by operand identifiers 374 and 375 and one or more operands identified by operand identifiers 374 and 375 may be overwritten by the results of the instruction, whereas in other embodiments, operands identified by identifiers 374 and 375 may be written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

FIG. 3F illustrates yet another possible operation encoding (opcode) format, in accordance with embodiments of the present disclosure. 64-bit single instruction multiple data (SIMD) arithmetic operations may be performed through a coprocessor data processing (CDP) instruction. Operation encoding (opcode) format 380 depicts one such CDP instruction having CDP opcode fields. The type of CDP instruction, for another embodiment, operations may be encoded by one or more of fields 383, 384, 387, and 388. Up to three operand locations per instruction may be identified, including up to two source operand identifiers 385 and 390 and one destination operand identifier 386. One embodiment of the coprocessor may operate on eight, sixteen, thirty-two, and 64-bit values. In one embodiment, an instruction may be performed on integer data elements. In some embodiments, an instruction may be executed conditionally, using condition field 381. For some embodiments, source data sizes may be encoded by field 383. In some embodiments, Zero (Z), negative (N), carry (C), and overflow (V) detection may be done on SIMD fields. For some instructions, the type of saturation may be encoded by field 384.

Figure 4A:
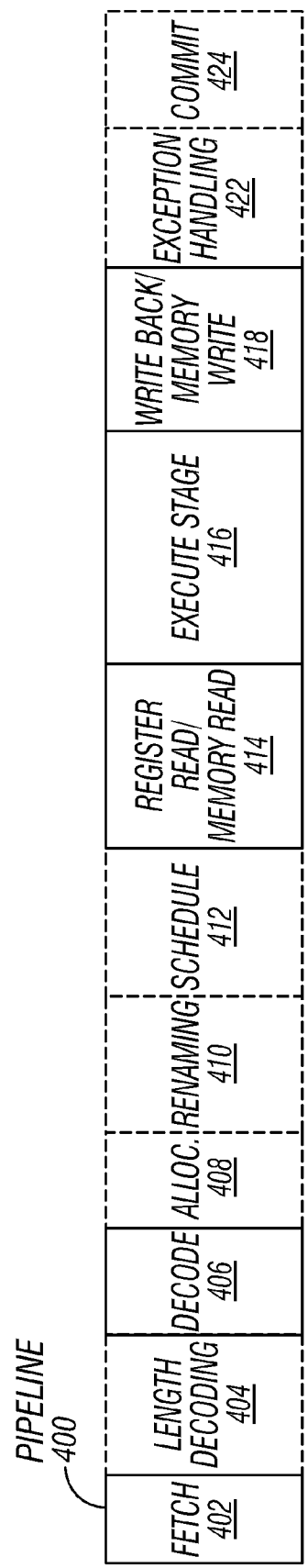
FIG. 4A is a block diagram illustrating an in-order pipeline and a register renaming stage, out-of-order issue/execution pipeline, in accordance with embodiments of the present disclosure.
Figure 4B:
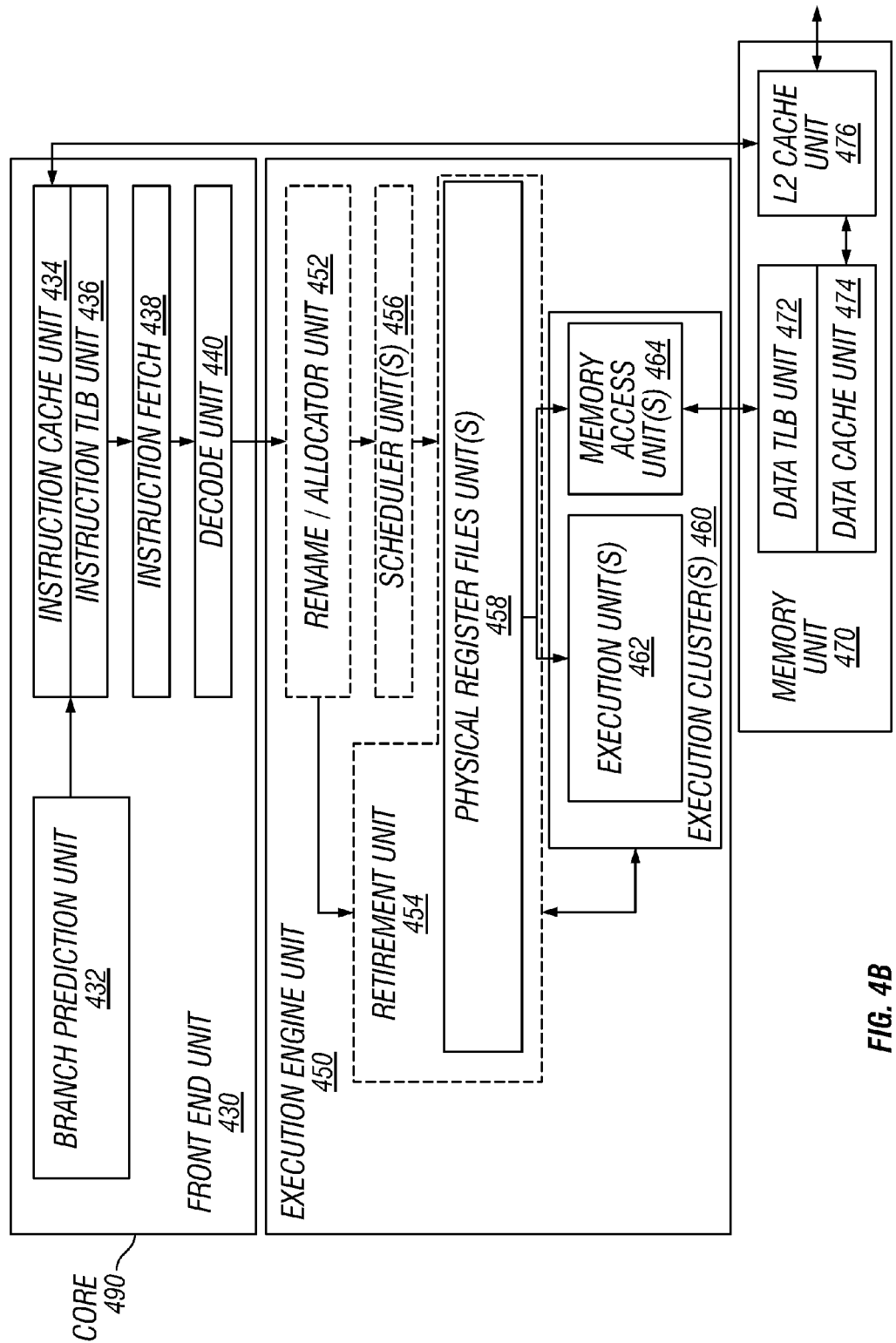
FIG. 4B is a block diagram illustrating an in-order architecture core and a register renaming logic, out-of-order issue/execution logic to be included in a processor, in accordance with embodiments of the present disclosure.

FIG. 4A is a block diagram illustrating an in-order pipeline and a register renaming stage, out-of-order issue/execution pipeline, in accordance with embodiments of the present disclosure. FIG. 4B is a block diagram illustrating an in-order architecture core and a register renaming logic, out-of-order issue/execution logic to be included in a processor, in accordance with embodiments of the present disclosure. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 may include a fetch stage 402, a length decode stage 404, a decode stage 406, an allocation stage 408, a renaming stage 410, a scheduling (also known as a dispatch or issue) stage 412, a register read/memory read stage 414, an execute stage 416, a write-back/memory-write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both may be coupled to a memory unit 470.

Core 490 may be a Reduced Instruction Set Computing (RISC) core, a Complex Instruction Set Computing (CISC) core, a Very Long Instruction Word (VLIW) core, or a hybrid or alternative core type. In one embodiment, core 490 may be a special-purpose core, such as, for example, a network or communication core, compression engine, graphics core, or the like.

Front end unit 430 may include a branch prediction unit 432 coupled to an instruction cache unit 434. Instruction cache unit 434 may be coupled to an instruction Translation Lookaside Buffer (TLB) 436. TLB 436 may be coupled to an instruction fetch unit 438, which is coupled to a decode unit 440. Decode unit 440 may decode instructions, and generate as an output one or more micro-operations, micro-code entry points, microinstructions, other instructions, or other control signals, which may be decoded from, or which otherwise reflect, or may be derived from, the original instructions. The decoder may be implemented using various different mechanisms. Examples of suitable mechanisms include, but are not limited to, look-up tables, hardware implementations, programmable logic arrays (PLAs), microcode read-only memories (ROMs), etc. In one embodiment, instruction cache unit 434 may be further coupled to a level 2 (L2) cache unit 476 in memory unit 470. Decode unit 440 may be coupled to a rename/allocator unit 452 in execution engine unit 450.

Execution engine unit 450 may include rename/allocator unit 452 coupled to a retirement unit 454 and a set of one or more scheduler units 456. Scheduler units 456 represent any number of different schedulers, including reservations stations, central instruction window, etc. Scheduler units 456 may be coupled to physical register file units 458. Each of physical register file units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. Physical register file units 458 may be overlapped by retirement unit 154 to illustrate various ways in which register renaming and out-of-order execution may be implemented (e.g., using one or more reorder buffers and one or more retirement register files, using one or more future files, one or more history buffers, and one or more retirement register files; using register maps and a pool of registers; etc.). Generally, the architectural registers may be visible from the outside of the processor or from a programmer's perspective. The registers might not be limited to any known particular type of circuit. Various different types of registers may be suitable as long as they store and provide data as described herein. Examples of suitable registers include, but might not be limited to, dedicated physical registers, dynamically allocated physical registers using register renaming, combinations of dedicated and dynamically allocated physical registers, etc. Retirement unit 454 and physical register file units 458 may be coupled to execution clusters 460. Execution clusters 460 may include a set of one or more execution units 162 and a set of one or more memory access units 464. Execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Scheduler units 456, physical register file units 458, and execution clusters 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file unit, and/or execution cluster—and in the case of a separate memory access pipeline, certain embodiments may be implemented in which only the execution cluster of this pipeline has memory access units 464). It should also be understood that where separate pipelines are used, one or more of these pipelines may be out-of-order issue/execution and the rest in-order.

The set of memory access units 464 may be coupled to memory unit 470, which may include a data TLB unit 472 coupled to a data cache unit 474 coupled to a level 2 (L2) cache unit 476. In one exemplary embodiment, memory access units 464 may include a load unit, a store address unit, and a store data unit, each of which may be coupled to data TLB unit 472 in memory unit 470. L2 cache unit 476 may be coupled to one or more other levels of cache and eventually to a main memory.

By way of example, the exemplary register renaming, out-of-order issue/execution core architecture may implement pipeline 400 as follows: 1) instruction fetch 438 may perform fetch and length decoding stages 402 and 404; 2) decode unit 440 may perform decode stage 406; 3) rename/allocator unit 452 may perform allocation stage 408 and renaming stage 410; 4) scheduler units 456 may perform schedule stage 412; 5) physical register file units 458 and memory unit 470 may perform register read/memory read stage 414; execution cluster 460 may perform execute stage 416; 6) memory unit 470 and physical register file units 458 may perform write-back/memory-write stage 418; 7) various units may be involved in the performance of exception handling stage 422; and 8) retirement unit 454 and physical register file units 458 may perform commit stage 424.

Core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads) in a variety of manners. Multithreading support may be performed by, for example, including time sliced multithreading, simultaneous multithreading (where a single physical core provides a logical core for each of the threads that physical core is simultaneously multithreading), or a combination thereof. Such a combination may include, for example, time sliced fetching and decoding and simultaneous multithreading thereafter such as in the Intel® Hyperthreading technology.

While register renaming may be described in the context of out-of-order execution, it should be understood that register renaming may be used in an in-order architecture. While the illustrated embodiment of the processor may also include a separate instruction and data cache units 434/474 and a shared L2 cache unit 476, other embodiments may have a single internal cache for both instructions and data, such as, for example, a Level 1 (L1) internal cache, or multiple levels of internal cache. In some embodiments, the system may include a combination of an internal cache and an external cache that may be external to the core and/or the processor. In other embodiments, all of the cache may be external to the core and/or the processor.

Figure 5A:
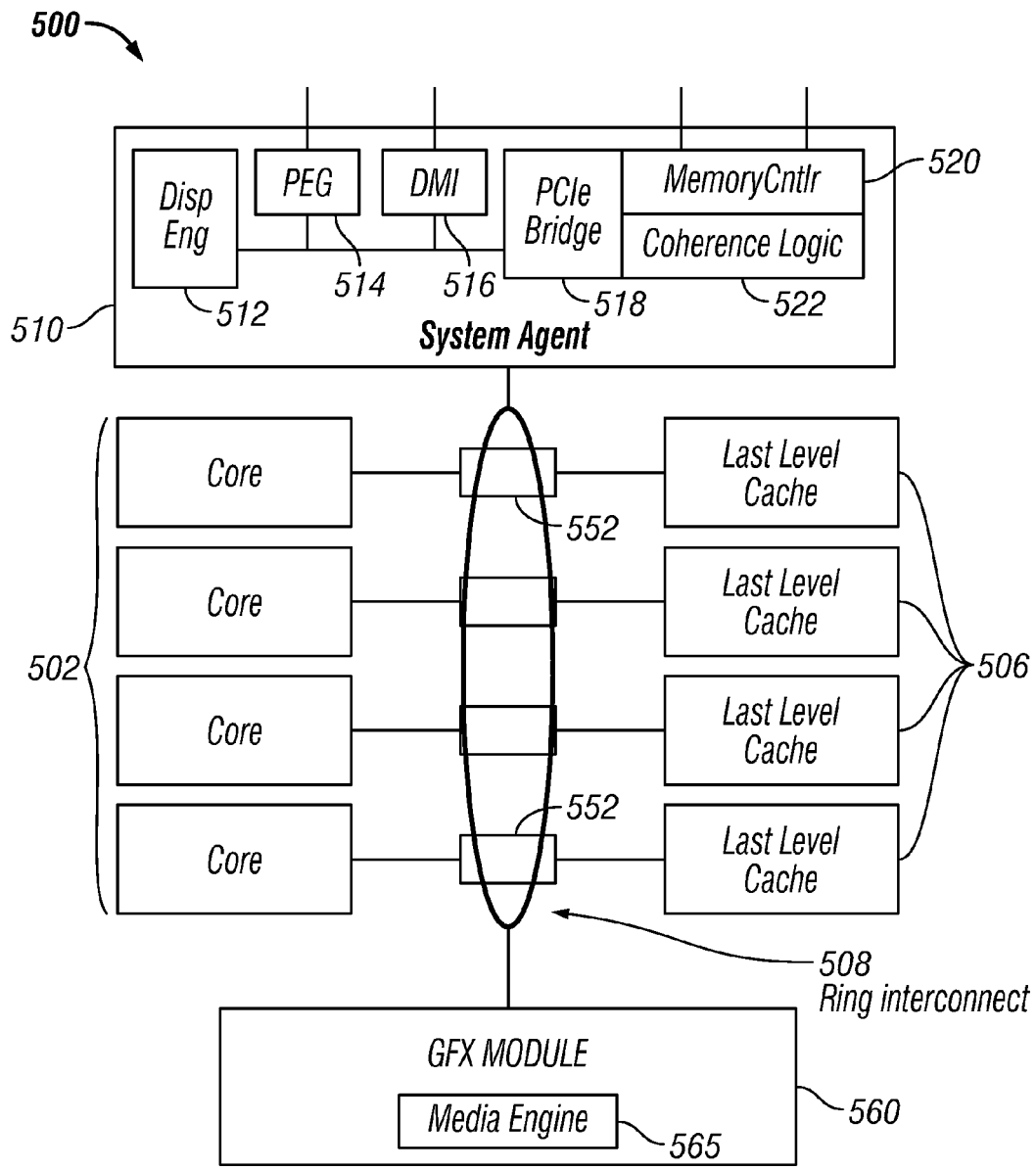
FIG. 5A is a block diagram of a processor, in accordance with embodiments of the present disclosure.

FIG. 5A is a block diagram of a processor 500, in accordance with embodiments of the present disclosure. In one embodiment, processor 500 may include a multicore processor. Processor 500 may include a system agent 510 communicatively coupled to one or more cores 502. Furthermore, cores 502 and system agent 510 may be communicatively coupled to one or more caches 506. Cores 502, system agent 510, and caches 506 may be communicatively coupled via one or more memory control units 552. Furthermore, cores 502, system agent 510, and caches 506 may be communicatively coupled to a graphics module 560 via memory control units 552.

Processor 500 may include any suitable mechanism for interconnecting cores 502, system agent 510, and caches 506, and graphics module 560. In one embodiment, processor 500 may include a ring-based interconnect unit 508 to interconnect cores 502, system agent 510, and caches 506, and graphics module 560. In other embodiments, processor 500 may include any number of well-known techniques for interconnecting such units. Ring-based interconnect unit 508 may utilize memory control units 552 to facilitate interconnections.

Processor 500 may include a memory hierarchy comprising one or more levels of caches within the cores, one or more shared cache units such as caches 506, or external memory (not shown) coupled to the set of integrated memory controller units 552. Caches 506 may include any suitable cache. In one embodiment, caches 506 may include one or more mid-level caches, such as Level 2 (L2), Level 3 (L3), Level 4 (L4), or other levels of cache, a last level cache (LLC), and/or combinations thereof.

In various embodiments, one or more of cores 502 may perform multi-threading. System agent 510 may include components for coordinating and operating cores 502. System agent unit 510 may include for example a Power Control Unit (PCU). The PCU may be or include logic and components needed for regulating the power state of cores 502. System agent 510 may include a display engine 512 for driving one or more externally connected displays or graphics module 560. System agent 510 may include an interface 1214 for communications busses for graphics. In one embodiment, interface 1214 may be implemented by PCI Express (PCIe). In a further embodiment, interface 1214 may be implemented by PCI Express Graphics (PEG). System agent 510 may include a direct media interface (DMI) 516. DMI 516 may provide links between different bridges on a motherboard or other portion of a computer system. System agent 510 may include a PCIe bridge 1218 for providing PCIe links to other elements of a computing system. PCIe bridge 1218 may be implemented using a memory controller 1220 and coherence logic 1222.

Cores 502 may be implemented in any suitable manner. Cores 502 may be homogenous or heterogeneous in terms of architecture and/or instruction set. In one embodiment, some of cores 502 may be in-order while others may be out-of-order. In another embodiment, two or more of cores 502 may execute the same instruction set, while others may execute only a subset of that instruction set or a different instruction set.

Processor 500 may include a general-purpose processor, such as a Core™ i3, i5, i7, 2 Duo and Quad, Xeon™, Itanium™, XScale™ or StrongARM™ processor, which may be available from Intel Corporation, of Santa Clara, Calif. Processor 500 may be provided from another company, such as ARM Holdings, Ltd, MIPS, etc. Processor 500 may be a special-purpose processor, such as, for example, a network or communication processor, compression engine, graphics processor, co-processor, embedded processor, or the like. Processor 500 may be implemented on one or more chips. Processor 500 may be a part of and/or may be implemented on one or more substrates using any of a number of process technologies, such as, for example, BiCMOS, CMOS, or NMOS.

In one embodiment, a given one of caches 506 may be shared by multiple ones of cores 502. In another embodiment, a given one of caches 506 may be dedicated to one of cores 502. The assignment of caches 506 to cores 502 may be handled by a cache controller or other suitable mechanism. A given one of caches 506 may be shared by two or more cores 502 by implementing time-slices of a given cache 506.

Graphics module 560 may implement an integrated graphics processing subsystem. In one embodiment, graphics module 560 may include a graphics processor. Furthermore, graphics module 560 may include a media engine 565. Media engine 565 may provide media encoding and video decoding.

Figure 5B:
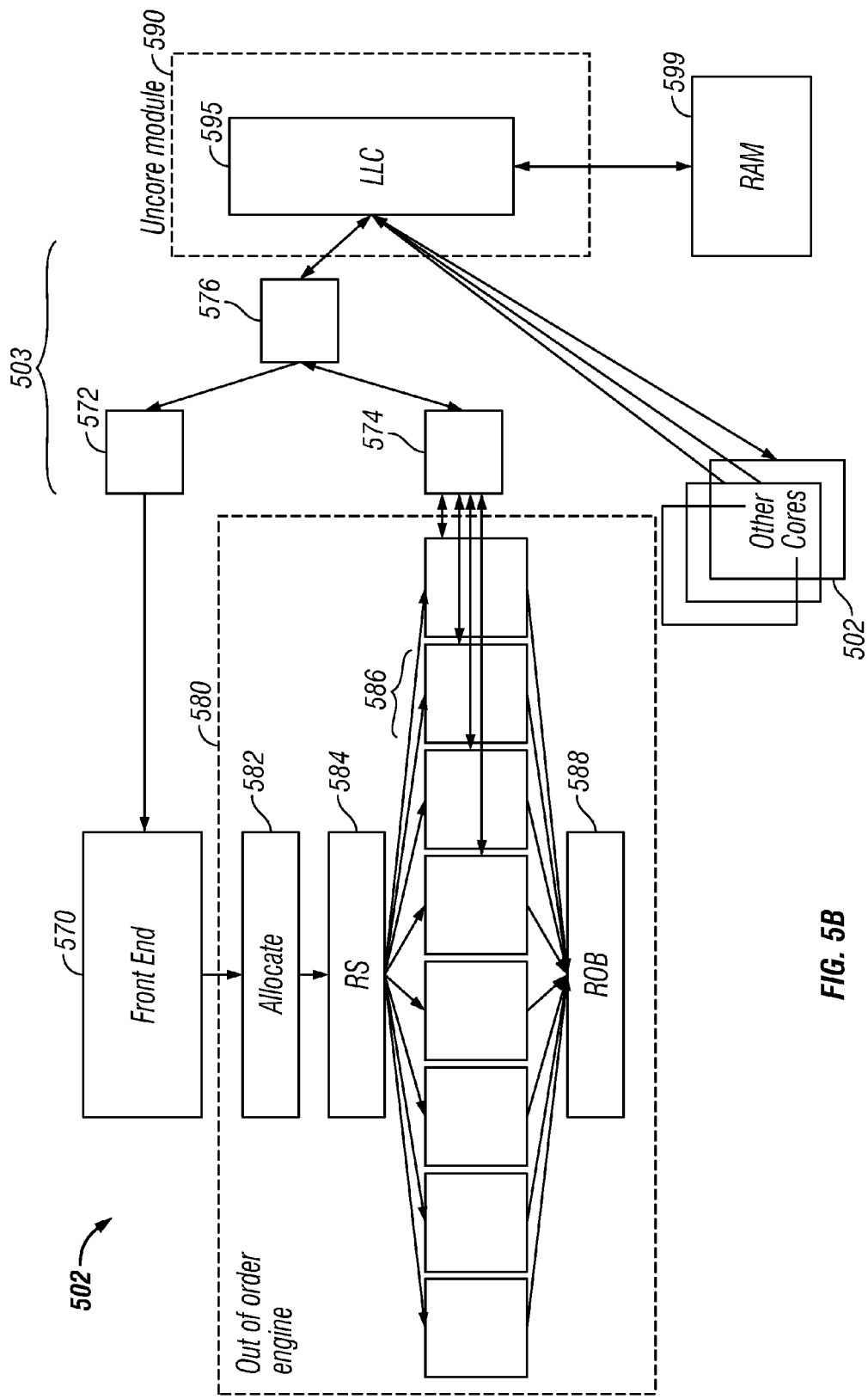
FIG. 5B is a block diagram of an example implementation of a core, in accordance with embodiments of the present disclosure.

FIG. 5B is a block diagram of an example implementation of a core 502, in accordance with embodiments of the present disclosure. Core 502 may include a front end 570 communicatively coupled to an out-of-order engine 580. Core 502 may be communicatively coupled to other portions of processor 500 through cache hierarchy 503.

Front end 570 may be implemented in any suitable manner, such as fully or in part by front end 201 as described above. In one embodiment, front end 570 may communicate with other portions of processor 500 through cache hierarchy 503. In a further embodiment, front end 570 may fetch instructions from portions of processor 500 and prepare the instructions to be used later in the processor pipeline as they are passed to out-of-order execution engine 580.

Out-of-order execution engine 580 may be implemented in any suitable manner, such as fully or in part by out-of-order execution engine 203 as described above. Out-of-order execution engine 580 may prepare instructions received from front end 570 for execution. Out-of-order execution engine 580 may include an allocate module 1282. In one embodiment, allocate module 1282 may allocate resources of processor 500 or other resources, such as registers or buffers, to execute a given instruction. Allocate module 1282 may make allocations in schedulers, such as a memory scheduler, fast scheduler, or floating point scheduler. Such schedulers may be represented in FIG. 5B by resource schedulers 584. Allocate module 1282 may be implemented fully or in part by the allocation logic described in conjunction with FIG. 2. Resource schedulers 584 may determine when an instruction is ready to execute based on the readiness of a given resource's sources and the availability of execution resources needed to execute an instruction. Resource schedulers 584 may be implemented by, for example, schedulers 202, 204, 206 as discussed above. Resource schedulers 584 may schedule the execution of instructions upon one or more resources. In one embodiment, such resources may be internal to core 502, and may be illustrated, for example, as resources 586. In another embodiment, such resources may be external to core 502 and may be accessible by, for example, cache hierarchy 503. Resources may include, for example, memory, caches, register files, or registers. Resources internal to core 502 may be represented by resources 586 in FIG. 5B. As necessary, values written to or read from resources 586 may be coordinated with other portions of processor 500 through, for example, cache hierarchy 503. As instructions are assigned resources, they may be placed into a reorder buffer 588. Reorder buffer 588 may track instructions as they are executed and may selectively reorder their execution based upon any suitable criteria of processor 500. In one embodiment, reorder buffer 588 may identify instructions or a series of instructions that may be executed independently. Such instructions or a series of instructions may be executed in parallel from other such instructions. Parallel execution in core 502 may be performed by any suitable number of separate execution blocks or virtual processors. In one embodiment, shared resources—such as memory, registers, and caches—may be accessible to multiple virtual processors within a given core 502. In other embodiments, shared resources may be accessible to multiple processing entities within processor 500.

Cache hierarchy 503 may be implemented in any suitable manner. For example, cache hierarchy 503 may include one or more lower or mid-level caches, such as caches 572, 574. In one embodiment, cache hierarchy 503 may include an LLC 595 communicatively coupled to caches 572, 574. In another embodiment, LLC 595 may be implemented in a module 590 accessible to all processing entities of processor 500. In a further embodiment, module 590 may be implemented in an uncore module of processors from Intel, Inc. Module 590 may include portions or subsystems of processor 500 necessary for the execution of core 502 but might not be implemented within core 502. Besides LLC 595, Module 590 may include, for example, hardware interfaces, memory coherency coordinators, interprocessor interconnects, instruction pipelines, or memory controllers. Access to RAM 599 available to processor 500 may be made through module 590 and, more specifically, LLC 595. Furthermore, other instances of core 502 may similarly access module 590. Coordination of the instances of core 502 may be facilitated in part through module 590.

Figure 6:
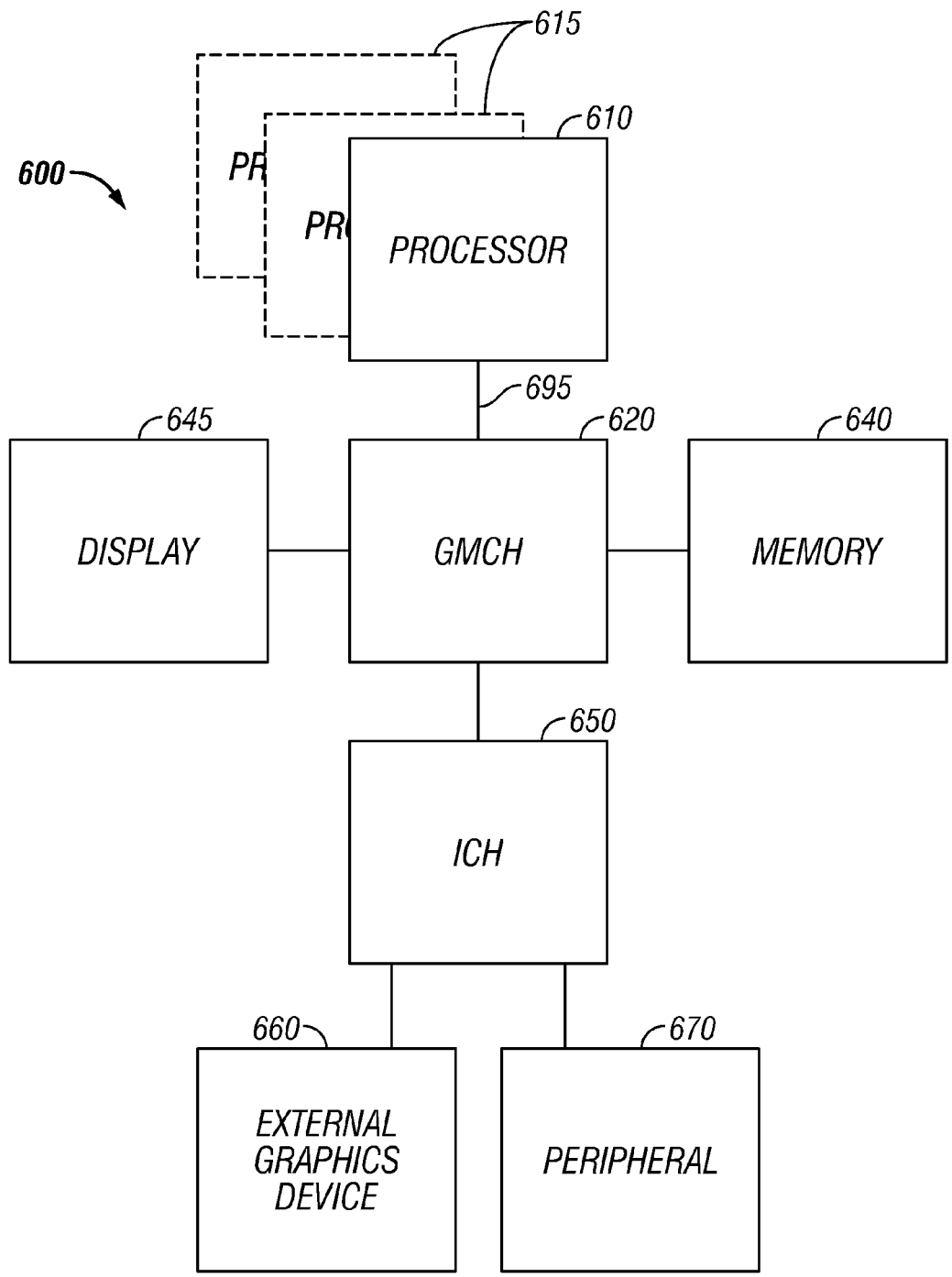
FIG. 6 is a block diagram of a system, in accordance with embodiments of the present disclosure.
Figure 7:
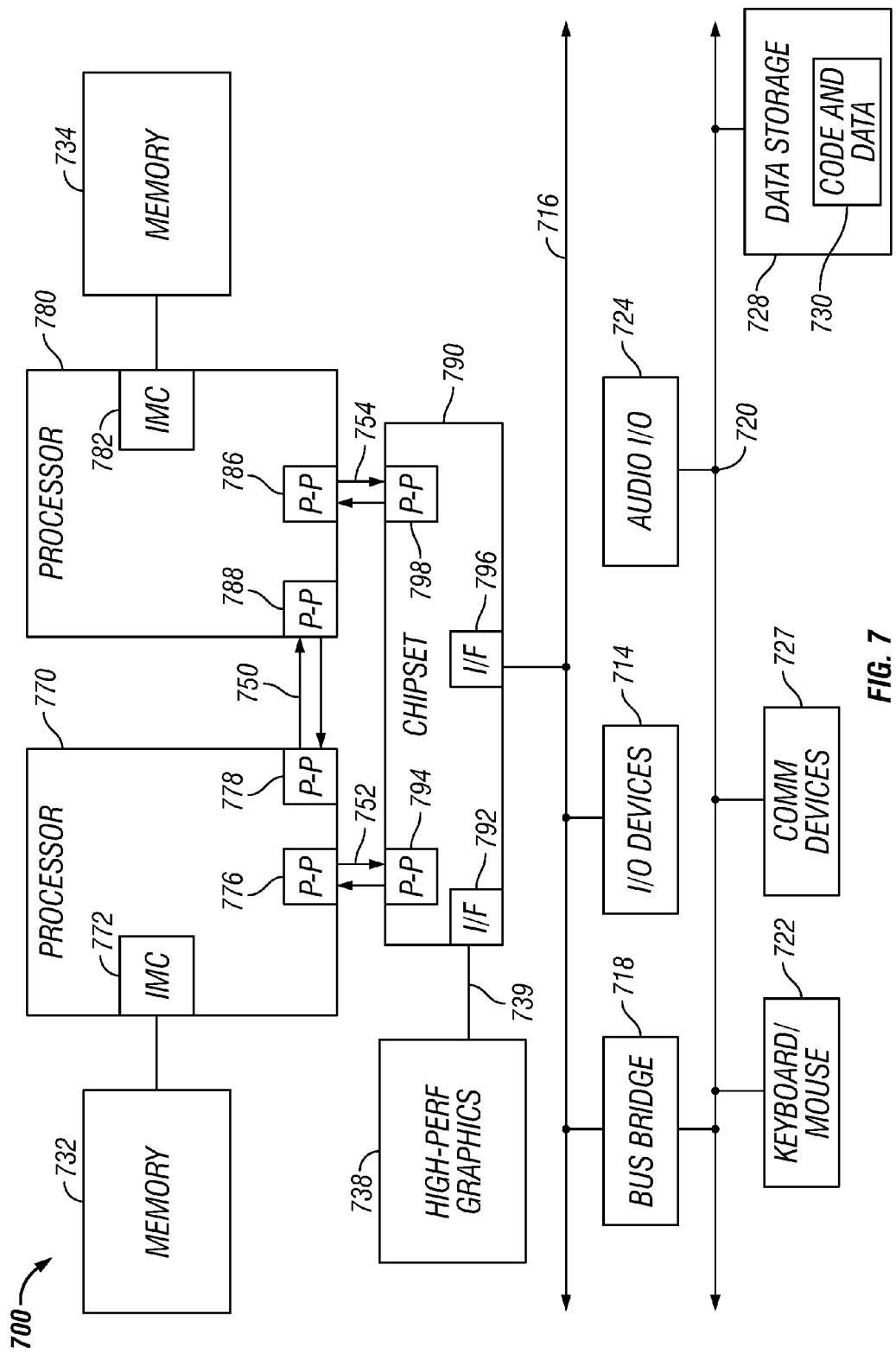
FIG. 7 is a block diagram of a second system, in accordance with embodiments of the present disclosure.
Figure 8:
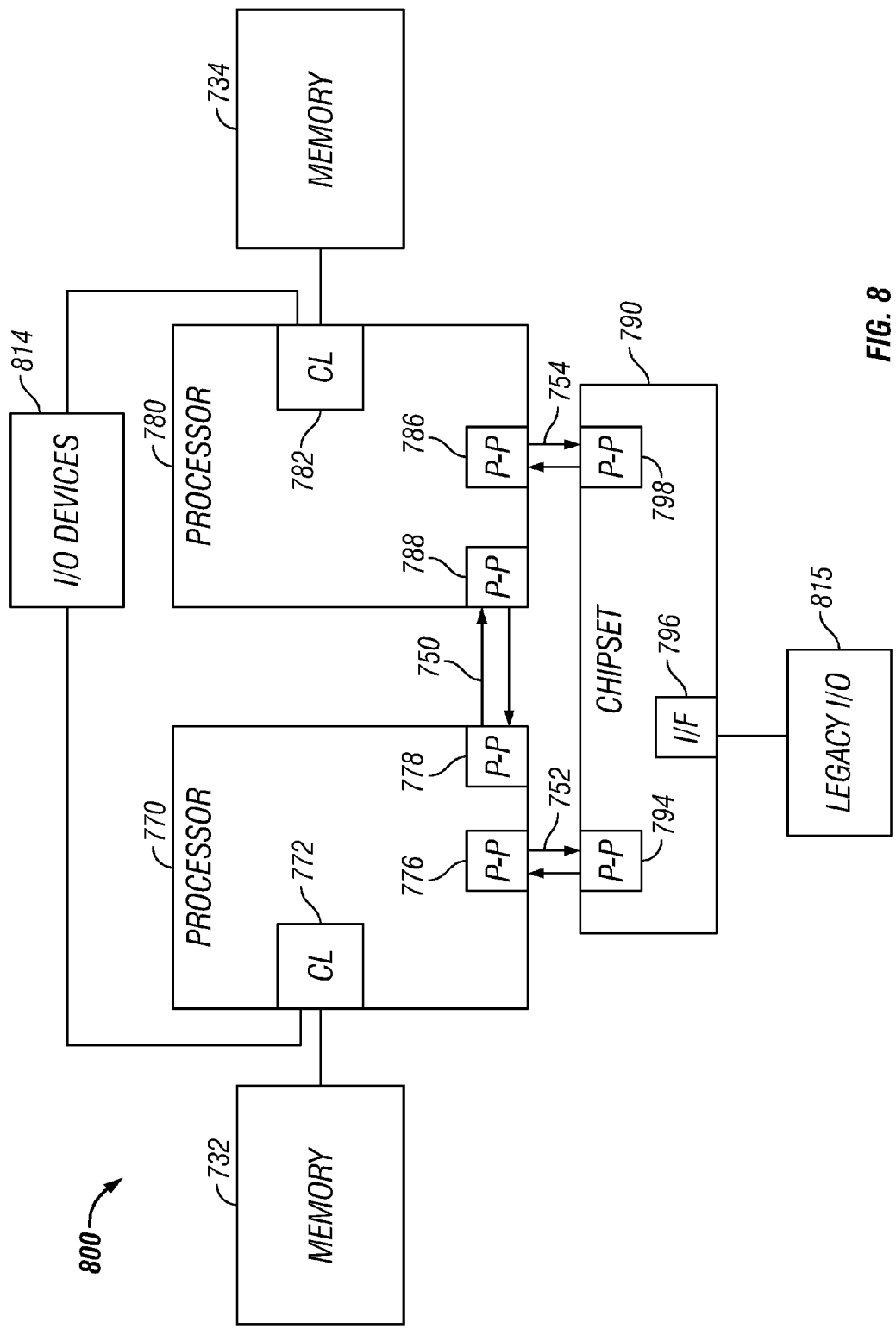
FIG. 8 is a block diagram of a third system in accordance with embodiments of the present disclosure.
Figure 9:
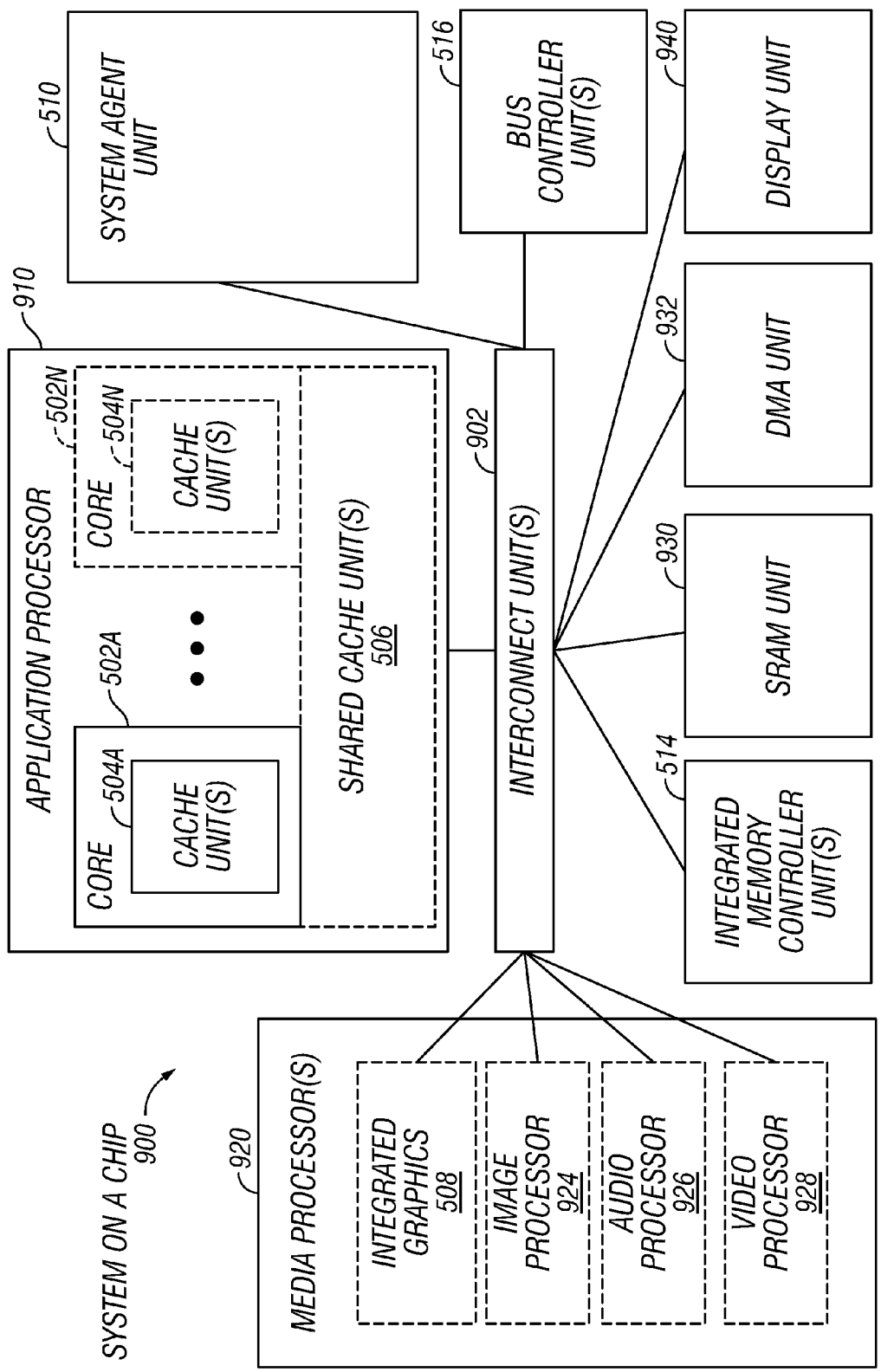
FIG. 9 is a block diagram of a system-on-a-chip, in accordance with embodiments of the present disclosure.

FIGS. 6-8 may illustrate exemplary systems suitable for including processor 500, while FIG. 9 may illustrate an exemplary System on a Chip (SoC) that may include one or more of cores 502. Other system designs and implementations known in the arts for laptops, desktops, handheld PCs, personal digital assistants, engineering workstations, servers, network devices, network hubs, switches, embedded processors, DSPs, graphics devices, video game devices, set-top boxes, micro controllers, cell phones, portable media players, hand held devices, and various other electronic devices, may also be suitable. In general, a huge variety of systems or electronic devices that incorporate a processor and/or other execution logic as disclosed herein may be generally suitable.

FIG. 6 illustrates a block diagram of a system 600, in accordance with embodiments of the present disclosure. System 600 may include one or more processors 610, 615, which may be coupled to Graphics Memory Controller Hub (GMCH) 620. The optional nature of additional processors 615 is denoted in FIG. 6 with broken lines.

Each processor 610,615 may be some version of processor 500. However, it should be noted that integrated graphics logic and integrated memory control units might not exist in processors 610,615. FIG. 6 illustrates that GMCH 620 may be coupled to a memory 640 that may be, for example, a dynamic random access memory (DRAM). The DRAM may, for at least one embodiment, be associated with a non-volatile cache.

GMCH 620 may be a chipset, or a portion of a chipset. GMCH 620 may communicate with processors 610, 615 and control interaction between processors 610, 615 and memory 640. GMCH 620 may also act as an accelerated bus interface between the processors 610, 615 and other elements of system 600. In one embodiment, GMCH 620 communicates with processors 610, 615 via a multi-drop bus, such as a frontside bus (FSB) 695.

Furthermore, GMCH 620 may be coupled to a display 645 (such as a flat panel display). In one embodiment, GMCH 620 may include an integrated graphics accelerator. GMCH 620 may be further coupled to an input/output (I/O) controller hub (ICH) 650, which may be used to couple various peripheral devices to system 600. External graphics device 660 may include be a discrete graphics device coupled to ICH 650 along with another peripheral device 670.

In other embodiments, additional or different processors may also be present in system 600. For example, additional processors 610, 615 may include additional processors that may be the same as processor 610, additional processors that may be heterogeneous or asymmetric to processor 610, accelerators (such as, e.g., graphics accelerators or digital signal processing (DSP) units), field programmable gate arrays, or any other processor. There may be a variety of differences between the physical resources 610, 615 in terms of a spectrum of metrics of merit including architectural, micro-architectural, thermal, power consumption characteristics, and the like. These differences may effectively manifest themselves as asymmetry and heterogeneity amongst processors 610, 615. For at least one embodiment, various processors 610, 615 may reside in the same die package.

FIG. 7 illustrates a block diagram of a second system 700, in accordance with embodiments of the present disclosure. As shown in FIG. 7, multiprocessor system 700 may include a point-to-point interconnect system, and may include a first processor 770 and a second processor 780 coupled via a point-to-point interconnect 750. Each of processors 770 and 780 may be some version of processor 500 as one or more of processors 610,615.

While FIG. 7 may illustrate two processors 770, 780, it is to be understood that the scope of the present disclosure is not so limited. In other embodiments, one or more additional processors may be present in a given processor.

Processors 770 and 780 are shown including integrated memory controller units 772 and 782, respectively. Processor 770 may also include as part of its bus controller units point-to-point (P-P) interfaces 776 and 778; similarly, second processor 780 may include P-P interfaces 786 and 788. Processors 770, 780 may exchange information via a point-to-point (P-P) interface 750 using P-P interface circuits 778, 788. As shown in FIG. 7, IMCs 772 and 782 may couple the processors to respective memories, namely a memory 732 and a memory 734, which in one embodiment may be portions of main memory locally attached to the respective processors.

Processors 770, 780 may each exchange information with a chipset 790 via individual P-P interfaces 752, 754 using point to point interface circuits 776, 794, 786, 798. In one embodiment, chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a Low Pin Count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures may be possible. For example, instead of the point-to-point architecture of FIG. 7, a system may implement a multi-drop bus or other such architecture.

FIG. 8 illustrates a block diagram of a third system 800 in accordance with embodiments of the present disclosure. Like elements in FIGS. 7 and 8 bear like reference numerals, and certain aspects of FIG. 7 have been omitted from FIG. 8 in order to avoid obscuring other aspects of FIG. 8.

FIG. 8 illustrates that processors 870, 880 may include integrated memory and I/O Control Logic ("CL") 872 and 882, respectively. For at least one embodiment, CL 872, 882 may include integrated memory controller units such as that described above in connection with FIGS. 5 and 7. In addition. CL 872, 882 may also include I/O control logic. FIG. 8 illustrates that not only memories 832, 834 may be coupled to CL 872, 882, but also that I/O devices 814 may also be coupled to control logic 872, 882. Legacy I/O devices 815 may be coupled to chipset 890.

FIG. 9 illustrates a block diagram of a SoC 900, in accordance with embodiments of the present disclosure. Similar elements in FIG. 5 bear like reference numerals. Also, dashed lined boxes may represent optional features on more advanced SoCs. An interconnect units 902 may be coupled to: an application processor 910 which may include a set of one or more cores 902A-N and shared cache units 906; a system agent unit 910; a bus controller units 916; an integrated memory controller units 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an SRAM unit 930; a DMA unit 932; and a display unit 940 for coupling to one or more external displays.

Figure 10:
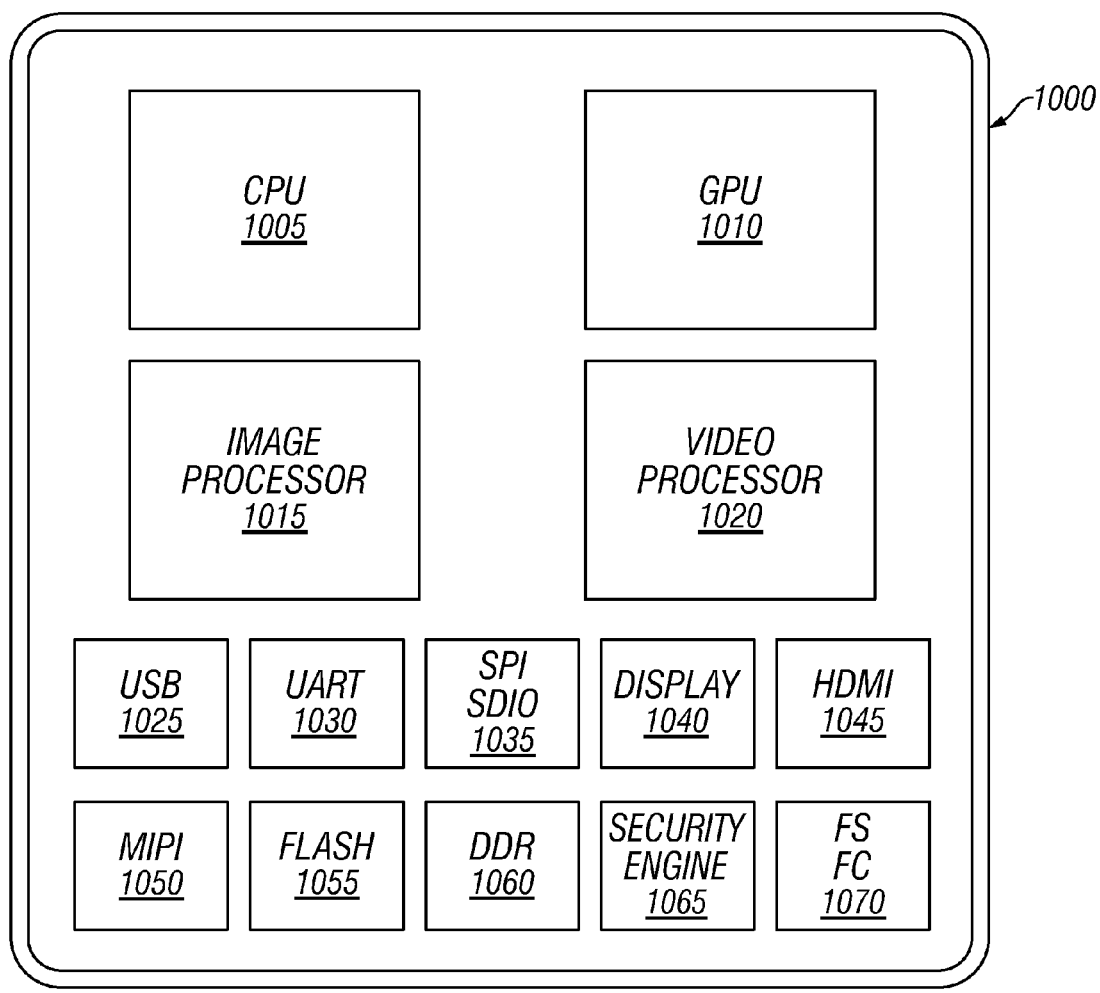
FIG. 10 illustrates a processor containing a central processing unit and a graphics processing unit which may perform at least one instruction, in accordance with embodiments of the present disclosure.

FIG. 10 illustrates a processor containing a Central Processing Unit (CPU) and a graphics processing unit (GPU), which may perform at least one instruction, in accordance with embodiments of the present disclosure. In one embodiment, an instruction to perform operations according to at least one embodiment could be performed by the CPU. In another embodiment, the instruction could be performed by the GPU. In still another embodiment, the instruction may be performed through a combination of operations performed by the GPU and the CPU. For example, in one embodiment, an instruction in accordance with one embodiment may be received and decoded for execution on the GPU. However, one or more operations within the decoded instruction may be performed by a CPU and the result returned to the GPU for final retirement of the instruction. Conversely, in some embodiments, the CPU may act as the primary processor and the GPU as the co-processor.

In some embodiments, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

In FIG. 10, processor 1000 includes a CPU 1005, GPU 1010, image processor 1015, video processor 1020, USB controller 1025, UART controller 1030, SPI/SDIO controller 1035, display device 1040, memory interface controller 1045, MIPI controller 1050, flash memory controller 1055, Dual Data Rate (DDR) controller 1060, security engine 1065, and $I^2S/I^2C$ controller 1070. Other logic and circuits may be included in the processor of FIG. 10, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine-readable medium ("tape") and supplied to various customers or manufacturing facilities to load into the fabrication machines that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 11:
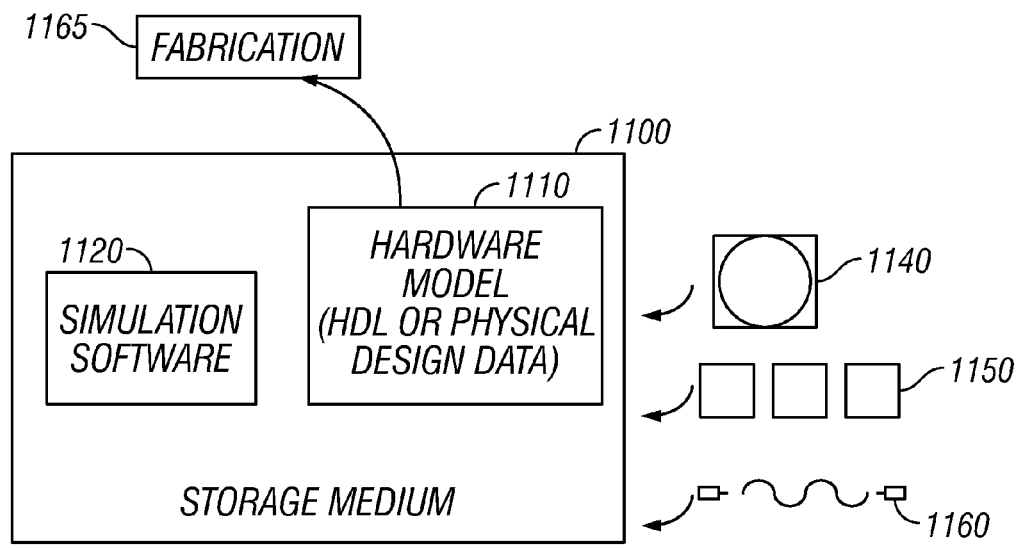
FIG. 11 is a block diagram illustrating the development of IP cores, in accordance with embodiments of the present disclosure.

FIG. 11 illustrates a block diagram illustrating the development of IP cores, in accordance with embodiments of the present disclosure. Storage 1130 may include simulation software 1120 and/or hardware or software model 1110. In one embodiment, the data representing the IP core design may be provided to storage 1130 via memory 1140 (e.g., hard disk), wired connection (e.g., internet) 1150 or wireless connection 1160. The IP core information generated by the simulation tool and model may then be transmitted to a fabrication facility where it may be fabricated by a third party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
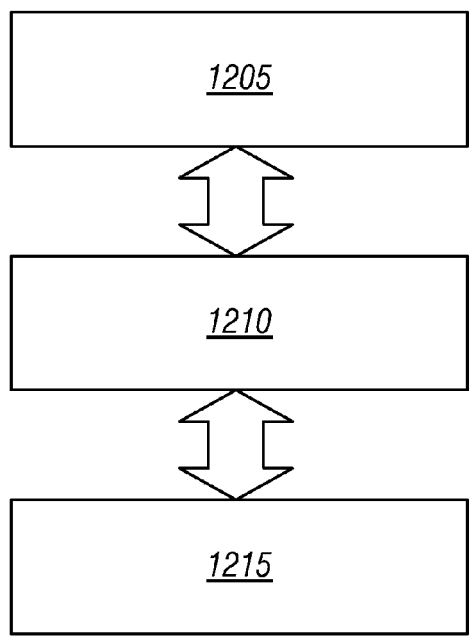
FIG. 12 illustrates how an instruction of a first type may be emulated by a processor of a different type, in accordance with embodiments of the present disclosure.

FIG. 12 illustrates how an instruction of a first type may be emulated by a processor of a different type, in accordance with embodiments of the present disclosure. In FIG. 12, program 1205 contains some instructions that may perform the same or substantially the same function as an instruction according to one embodiment. However the instructions of program 1205 may be of a type and/or format that is different from or incompatible with processor 1215, meaning the instructions of the type in program 1205 may not be able to execute natively by the processor 1215. However, with the help of emulation logic, 1210, the instructions of program 1205 may be translated into instructions that may be natively be executed by the processor 1215. In one embodiment, the emulation logic may be embodied in hardware. In another embodiment, the emulation logic may be embodied in a tangible, machine-readable medium containing software to translate instructions of the type in program 1205 into the type natively executable by processor 1215. In other embodiments, emulation logic may be a combination of fixed-function or programmable hardware and a program stored on a tangible, machine-readable medium. In one embodiment, the processor contains the emulation logic, whereas in other embodiments, the emulation logic exists outside of the processor and may be provided by a third party. In one embodiment, the processor may load the emulation logic embodied in a tangible, machine-readable medium containing software by executing microcode or firmware contained in or associated with the processor.

Figure 13:
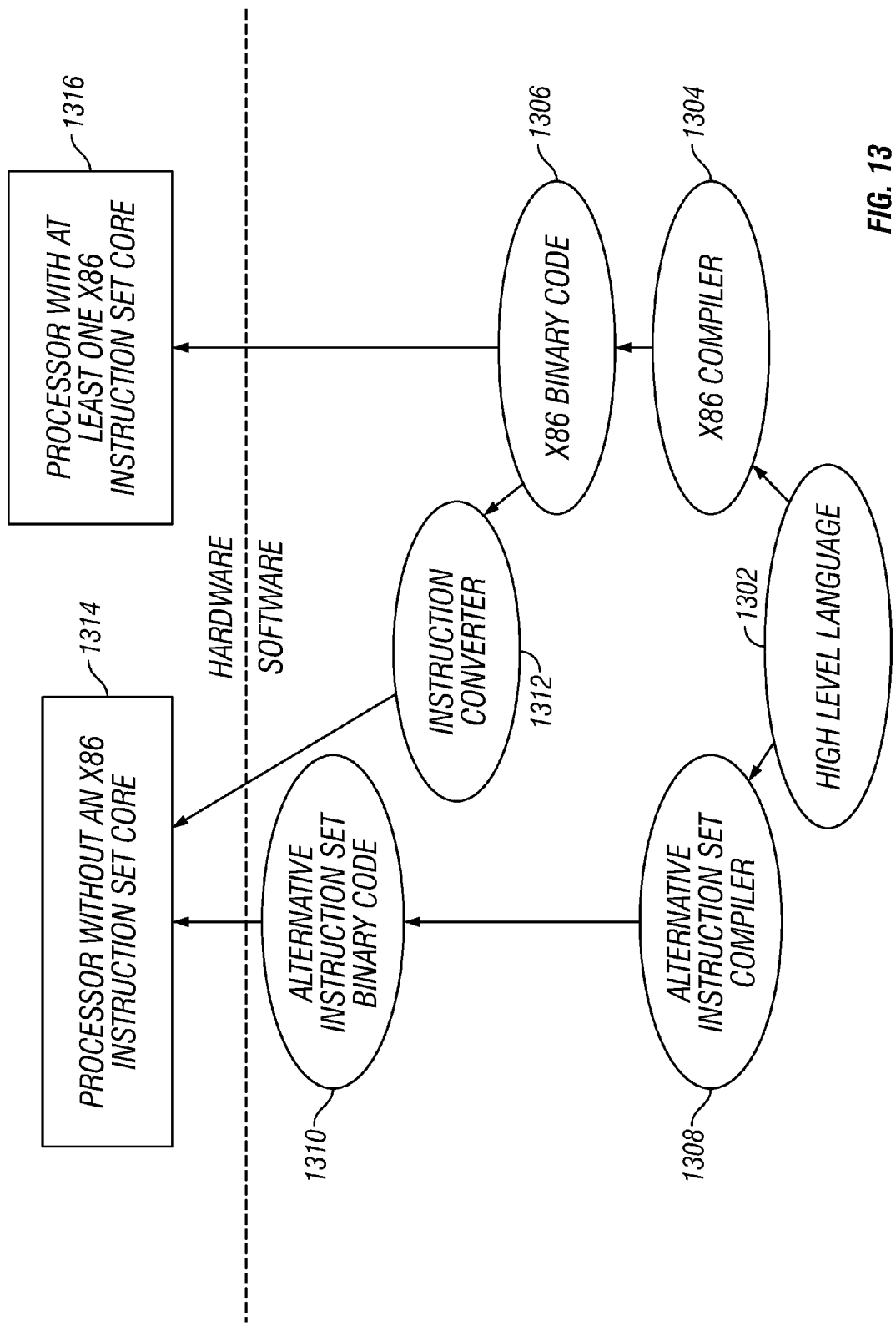
FIG. 13 illustrates a block diagram contrasting the use of a software instruction converter to convert binary instructions in a source instruction set to binary instructions in a target instruction set, in accordance with embodiments of the present disclosure.

FIG. 13 illustrates a block diagram contrasting the use of a software instruction converter to convert binary instructions in a source instruction set to binary instructions in a target instruction set, in accordance with embodiments of the present disclosure. In the illustrated embodiment, the instruction converter may be a software instruction converter, although the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that may perform substantially the same functions as a Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. x86 compiler 1304 represents a compiler that may be operable to generate x86 binary code 1306 (e.g., object code) that may, with or without additional linkage processing, be executed on the processor with at least one x86 instruction set core 1316. Similarly, FIG. 13 shows the program in high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). Instruction converter 1312 may be used to convert x86 binary code 1306 into code that may be natively executed by the processor without an x86 instruction set core 1314. This converted code might not be the same as alternative instruction set binary code 1310; however, the converted code will accomplish the general operation and be made up of instructions from the alternative instruction set. Thus, instruction converter 1312 represents software, firmware, hardware, or a combination thereof that, through emulation, simulation or any other process, allows a processor or other electronic device that does not have an x86 instruction set processor or core to execute x86 binary code 1306.

Figure 14:
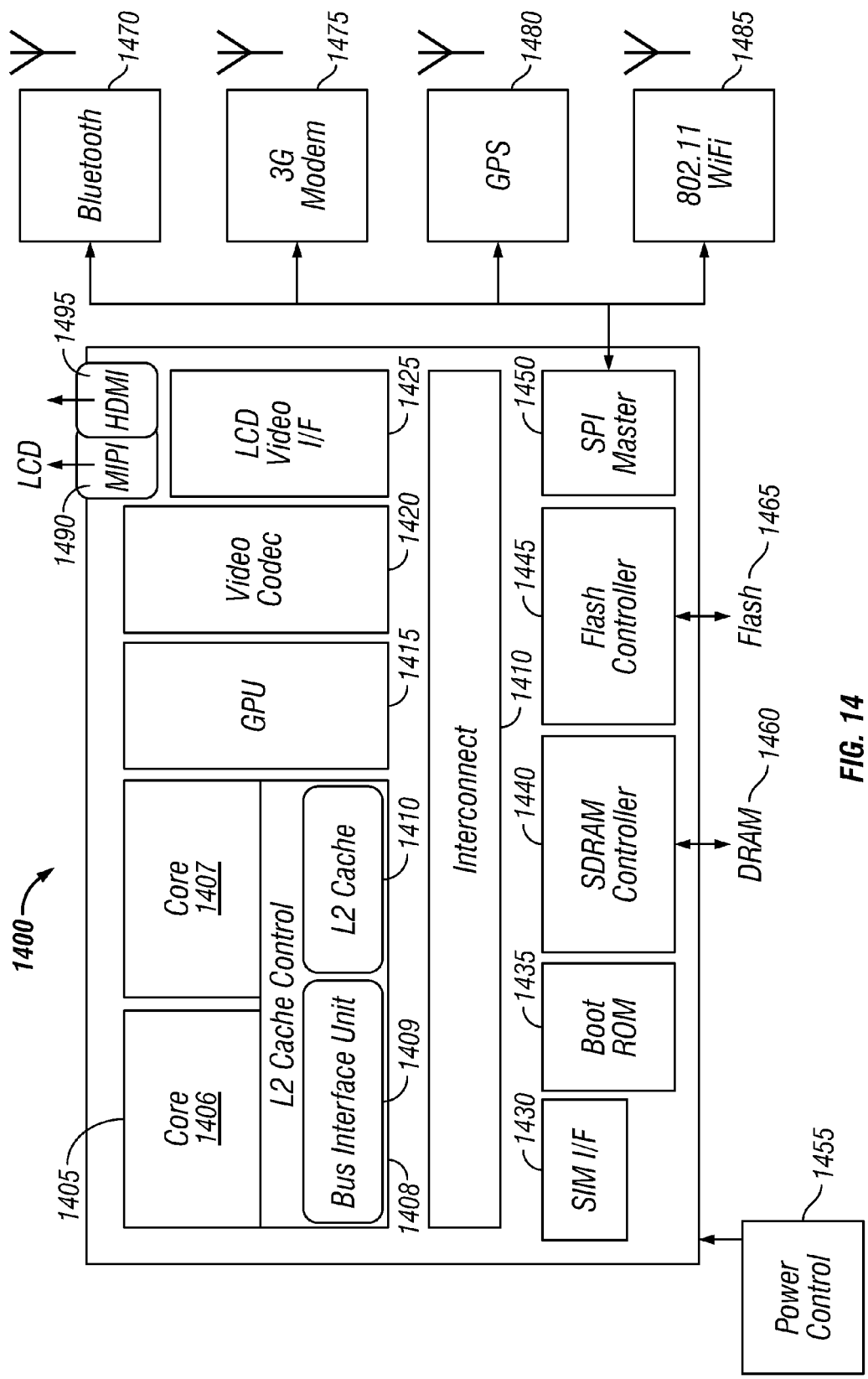
FIG. 14 is a block diagram of an instruction set architecture of a processor, in accordance with embodiments of the present disclosure.

FIG. 14 is a block diagram of an instruction set architecture 1400 of a processor, in accordance with embodiments of the present disclosure. Instruction set architecture 1400 may include any suitable number or kind of components.

For example, instruction set architecture 1400 may include processing entities such as one or more cores 1406, 1407 and a graphics processing unit 1415. Cores 1406, 1407 may be communicatively coupled to the rest of instruction set architecture 1400 through any suitable mechanism, such as through a bus or cache. In one embodiment, cores 1406, 1407 may be communicatively coupled through an L2 cache control 1408, which may include a bus interface unit 1409 and an L2 cache 1410. Cores 1406, 1407 and graphics processing unit 1415 may be communicatively coupled to each other and to the remainder of instruction set architecture 1400 through interconnect 1410. In one embodiment, graphics processing unit 1415 may use a video code 1420 defining the manner in which particular video signals will be encoded and decoded for output.

Instruction set architecture 1400 may also include any number or kind of interfaces, controllers, or other mechanisms for interfacing or communicating with other portions of an electronic device or system. Such mechanisms may facilitate interaction with, for example, peripherals, communications devices, other processors, or memory. In the example of FIG. 14, instruction set architecture 1400 may include an LCD video interface 1425, a Subscriber Interface Module (SIM) interface 1430, a boot ROM interface 1435, an SDRAM controller 1440, a flash controller 1445, and a Serial Peripheral Interface (SPI) master unit 1450. LCD video interface 1425 may provide output of video signals from, for example, GPU 1415 and through, for example, a Mobile Industry Processor Interface (MIPI) 1490 or a High-Definition Multimedia Interface (HDMI) 1495 to a display. Such a display may include, for example, an LCD. SIM interface 1430 may provide access to or from a SIM card or device. SDRAM controller 1440 may provide access to or from memory such as an SDRAM chip or module. Flash controller 1445 may provide access to or from memory such as flash memory or other instances of RAM. SPI master unit 1450 may provide access to or from communications modules, such as a Bluetooth module 1470, high-speed 3G modem 1475, global positioning system module 1480, or wireless module 1485 implementing a communications standard such as 802.11.

Figure 15:
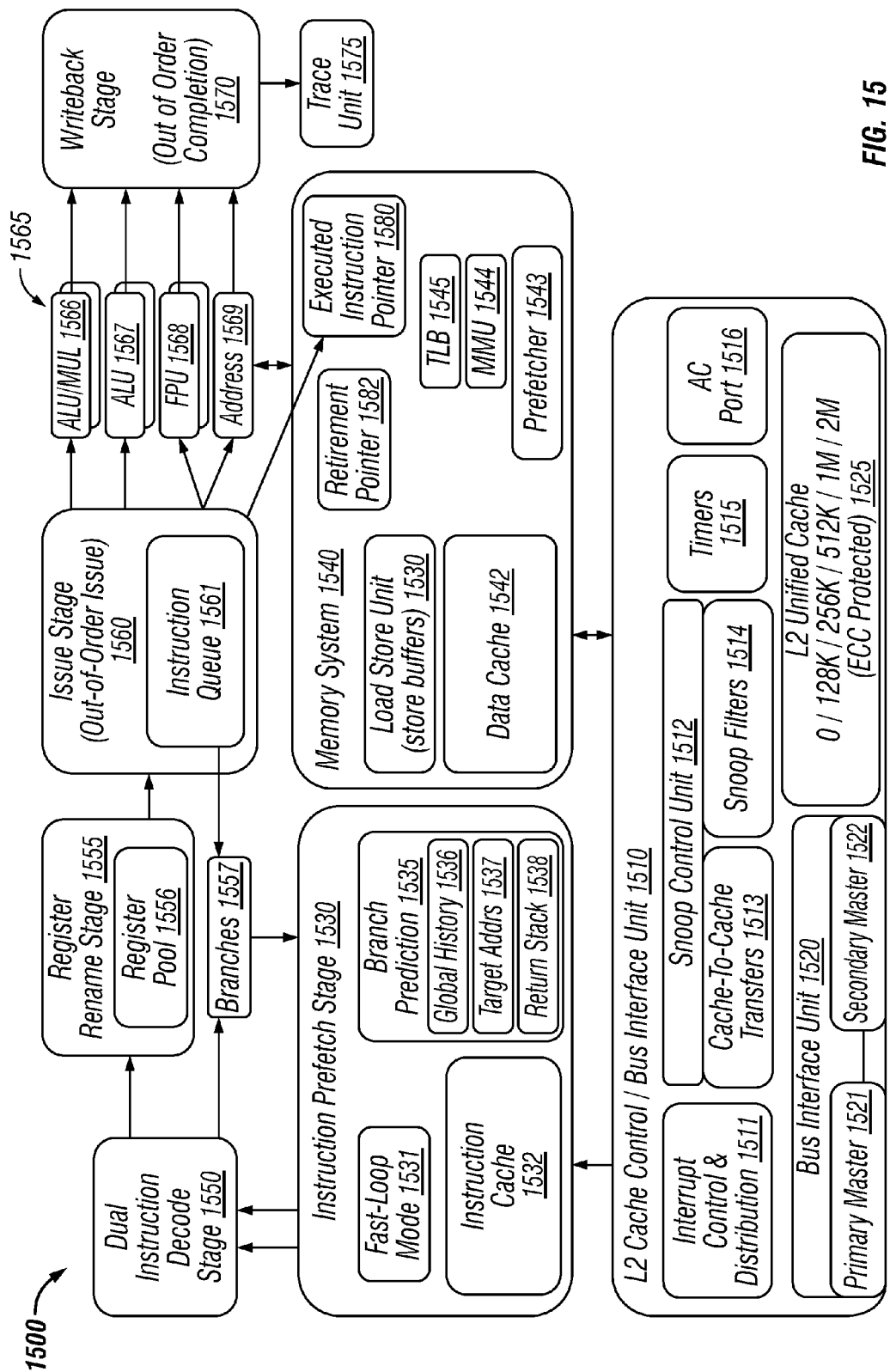
FIG. 15 is a more detailed block diagram of an instruction set architecture of a processor, in accordance with embodiments of the present disclosure.

FIG. 15 is a more detailed block diagram of an instruction set architecture 1500 of a processor, in accordance with embodiments of the present disclosure. Instruction architecture 1500 may implement one or more aspects of instruction set architecture 1400. Furthermore, instruction set architecture 1500 may illustrate modules and mechanisms for the execution of instructions within a processor.

Instruction architecture 1500 may include a memory system 1540 communicatively coupled to one or more execution entities 1565. Furthermore, instruction architecture 1500 may include a caching and bus interface unit such as unit 1510 communicatively coupled to execution entities 1565 and memory system 1540. In one embodiment, loading of instructions into execution entities 1564 may be performed by one or more stages of execution. Such stages may include, for example, instruction prefetch stage 1530, dual instruction decode stage 1550, register rename stage 155, issue stage 1560, and writeback stage 1570.

In one embodiment, memory system 1540 may include an executed instruction pointer 1580. Executed instruction pointer 1580 may store a value identifying the oldest, undispatched instruction within a batch of instructions. The oldest instruction may correspond to the lowest Program Order (PO) value. A PO may include a unique number of an instruction. Such an instruction may be a single instruction within a thread represented by multiple strands. A PO may be used in ordering instructions to ensure correct execution semantics of code. A PO may be reconstructed by mechanisms such as evaluating increments to PO encoded in the instruction rather than an absolute value. Such a reconstructed PO may be known as an "RPO." Although a PO may be referenced herein, such a PO may be used interchangeably with an RPO. A strand may include a sequence of instructions that are data dependent upon each other. The strand may be arranged by a binary translator at compilation time. Hardware executing a strand may execute the instructions of a given strand in order according to PO of the various instructions. A thread may include multiple strands such that instructions of different strands may depend upon each other. A PO of a given strand may be the PO of the oldest instruction in the strand which has not yet been dispatched to execution from an issue stage. Accordingly, given a thread of multiple strands, each strand including instructions ordered by PO, executed instruction pointer 1580 may store the oldest—illustrated by the lowest number—PO in the thread.

In another embodiment, memory system 1540 may include a retirement pointer 1582. Retirement pointer 1582 may store a value identifying the PO of the last retired instruction. Retirement pointer 1582 may be set by, for example, retirement unit 454. If no instructions have yet been retired, retirement pointer 1582 may include a null value.

Execution entities 1565 may include any suitable number and kind of mechanisms by which a processor may execute instructions. In the example of FIG. 15, execution entities 1565 may include ALU/Multiplication Units (MUL) 1566, ALUs 1567, and Floating Point Units (FPU) 1568. In one embodiment, such entities may make use of information contained within a given address 1569. Execution entities 1565 in combination with stages 1530, 1550, 1555, 1560, 1570 may collectively form an execution unit.

Unit 1510 may be implemented in any suitable manner. In one embodiment, unit 1510 may perform cache control. In such an embodiment, unit 1510 may thus include a cache 1525. Cache 1525 may be implemented, in a further embodiment, as an L2 unified cache with any suitable size, such as zero, 128 k, 256 k, 512 k, 1 M, or 2 M bytes of memory. In another, further embodiment, cache 1525 may be implemented in error-correcting code memory. In another embodiment, unit 1510 may perform bus interfacing to other portions of a processor or electronic device. In such an embodiment, unit 1510 may thus include a bus interface unit 1520 for communicating over an interconnect, intraprocessor bus, interprocessor bus, or other communication bus, port, or line. Bus interface unit 1520 may provide interfacing in order to perform, for example, generation of the memory and input/output addresses for the transfer of data between execution entities 1565 and the portions of a system external to instruction architecture 1500.

To further facilitate its functions, bus interface unit 1520 may include an interrupt control and distribution unit 1511 for generating interrupts and other communications to other portions of a processor or electronic device. In one embodiment, bus interface unit 1520 may include a snoop control unit 1512 that handles cache access and coherency for multiple processing cores. In a further embodiment, to provide such functionality, snoop control unit 1512 may include a cache-to-cache transfer unit that handles information exchanges between different caches. In another, further embodiment, snoop control unit 1512 may include one or more snoop filters 1514 that monitors the coherency of other caches (not shown) so that a cache controller, such as unit 1510, does not have to perform such monitoring directly. Unit 1510 may include any suitable number of timers 1515 for synchronizing the actions of instruction architecture 1500. Also, unit 1510 may include an AC port 1516.

Memory system 1540 may include any suitable number and kind of mechanisms for storing information for the processing needs of instruction architecture 1500. In one embodiment, memory system 1504 may include a load store unit 1530 for storing information such as buffers written to or read back from memory or registers. In another embodiment, memory system 1504 may include a translation lookaside buffer (TLB) 1545 that provides look-up of address values between physical and virtual addresses. In yet another embodiment, bus interface unit 1520 may include a Memory Management Unit (MMU) 1544 for facilitating access to virtual memory. In still yet another embodiment, memory system 1504 may include a prefetcher 1543 for requesting instructions from memory before such instructions are actually needed to be executed, in order to reduce latency.

The operation of instruction architecture 1500 to execute an instruction may be performed through different stages. For example, using unit 1510 instruction prefetch stage 1530 may access an instruction through prefetcher 1543. Instructions retrieved may be stored in instruction cache 1532. Prefetch stage 1530 may enable an option 1531 for fast-loop mode, wherein a series of instructions forming a loop that is small enough to fit within a given cache are executed. In one embodiment, such an execution may be performed without needing to access additional instructions from, for example, instruction cache 1532. Determination of what instructions to prefetch may be made by, for example, branch prediction unit 1535, which may access indications of execution in global history 1536, indications of target addresses 1537, or contents of a return stack 1538 to determine which of branches 1557 of code will be executed next. Such branches may be possibly prefetched as a result. Branches 1557 may be produced through other stages of operation as described below. Instruction prefetch stage 1530 may provide instructions as well as any predictions about future instructions to dual instruction decode stage.

Dual instruction decode stage 1550 may translate a received instruction into microcode-based instructions that may be executed. Dual instruction decode stage 1550 may simultaneously decode two instructions per clock cycle. Furthermore, dual instruction decode stage 1550 may pass its results to register rename stage 1555. In addition, dual instruction decode stage 1550 may determine any resulting branches from its decoding and eventual execution of the microcode. Such results may be input into branches 1557.

Register rename stage 1555 may translate references to virtual registers or other resources into references to physical registers or resources. Register rename stage 1555 may include indications of such mapping in a register pool 1556. Register rename stage 1555 may alter the instructions as received and send the result to issue stage 1560.

Issue stage 1560 may issue or dispatch commands to execution entities 1565. Such issuance may be performed in an out-of-order fashion. In one embodiment, multiple instructions may be held at issue stage 1560 before being executed. Issue stage 1560 may include an instruction queue 1561 for holding such multiple commands. Instructions may be issued by issue stage 1560 to a particular processing entity 1565 based upon any acceptable criteria, such as availability or suitability of resources for execution of a given instruction. In one embodiment, issue stage 1560 may reorder the instructions within instruction queue 1561 such that the first instructions received might not be the first instructions executed. Based upon the ordering of instruction queue 1561, additional branching information may be provided to branches 1557. Issue stage 1560 may pass instructions to executing entities 1565 for execution.

Upon execution, writeback stage 1570 may write data into registers, queues, or other structures of instruction set architecture 1500 to communicate the completion of a given command. Depending upon the order of instructions arranged in issue stage 1560, the operation of writeback stage 1570 may enable additional instructions to be executed. Performance of instruction set architecture 1500 may be monitored or debugged by trace unit 1575.

Figure 16:
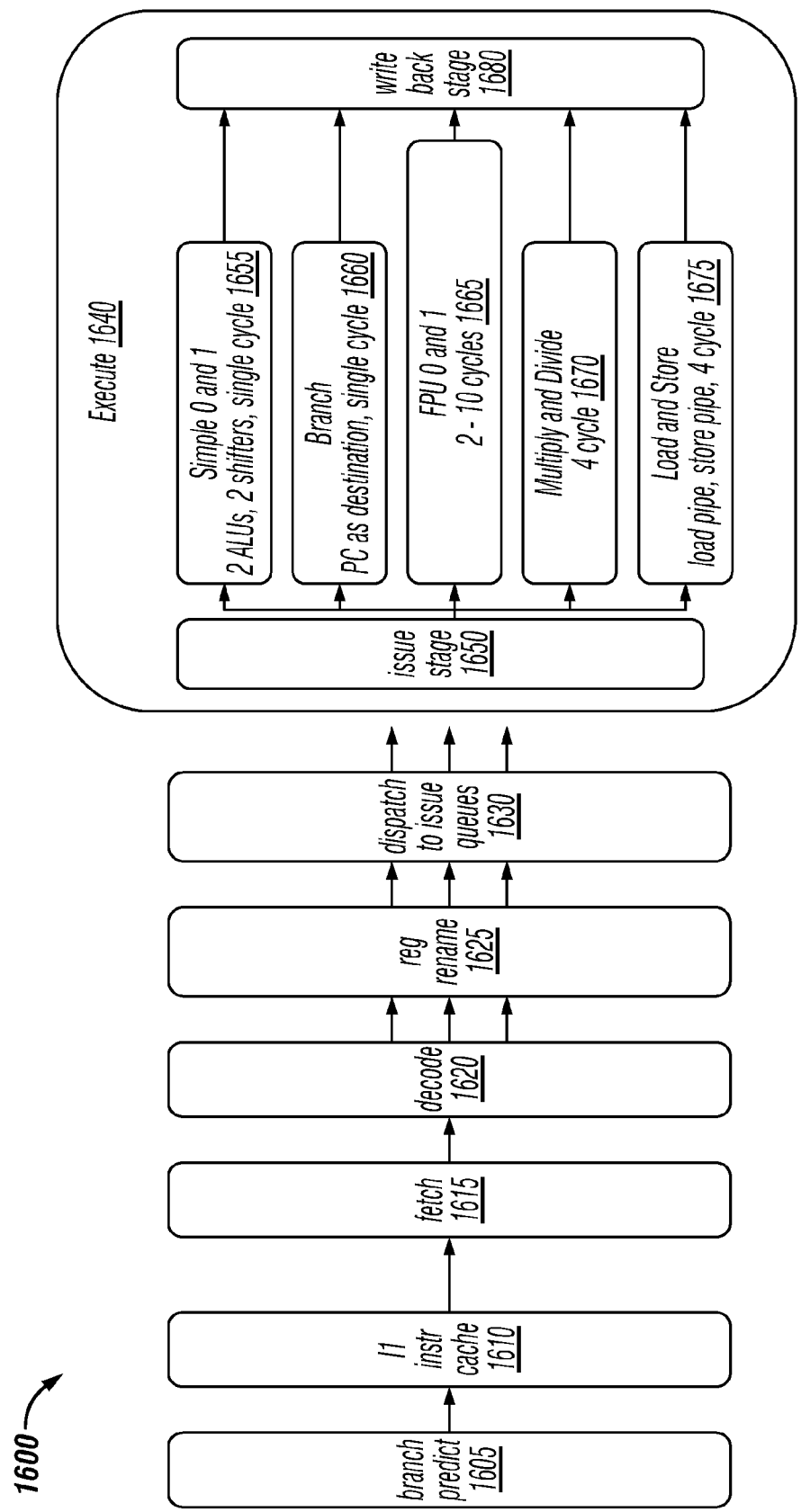
FIG. 16 is a block diagram of an execution pipeline for an instruction set architecture of a processor, in accordance with embodiments of the present disclosure.

FIG. 16 is a block diagram of an execution pipeline 1600 for an instruction set architecture of a processor, in accordance with embodiments of the present disclosure. Execution pipeline 1600 may illustrate operation of, for example, instruction architecture 1500 of FIG. 15.

Execution pipeline 1600 may include any suitable combination of steps or operations. In 1605, predictions of the branch that is to be executed next may be made. In one embodiment, such predictions may be based upon previous executions of instructions and the results thereof. In 1610, instructions corresponding to the predicted branch of execution may be loaded into an instruction cache. In 1615, one or more such instructions in the instruction cache may be fetched for execution. In 1620, the instructions that have been fetched may be decoded into microcode or more specific machine language. In one embodiment, multiple instructions may be simultaneously decoded. In 1625, references to registers or other resources within the decoded instructions may be reassigned. For example, references to virtual registers may be replaced with references to corresponding physical registers. In 1630, the instructions may be dispatched to queues for execution. In 1640, the instructions may be executed. Such execution may be performed in any suitable manner. In 1650, the instructions may be issued to a suitable execution entity. The manner in which the instruction is executed may depend upon the specific entity executing the instruction. For example, at 1655, an ALU may perform arithmetic functions. The ALU may utilize a single clock cycle for its operation, as well as two shifters. In one embodiment, two ALUs may be employed, and thus two instructions may be executed at 1655. At 1660, a determination of a resulting branch may be made. A program counter may be used to designate the destination to which the branch will be made. 1660 may be executed within a single clock cycle. At 1665, floating point arithmetic may be performed by one or more FPUs. The floating point operation may require multiple clock cycles to execute, such as two to ten cycles. At 1670, multiplication and division operations may be performed. Such operations may be performed in four clock cycles. At 1675, loading and storing operations to registers or other portions of pipeline 1600 may be performed. The operations may include loading and storing addresses. Such operations may be performed in four clock cycles. At 1680, write-back operations may be performed as required by the resulting operations of 1655-1675.

Figure 17:
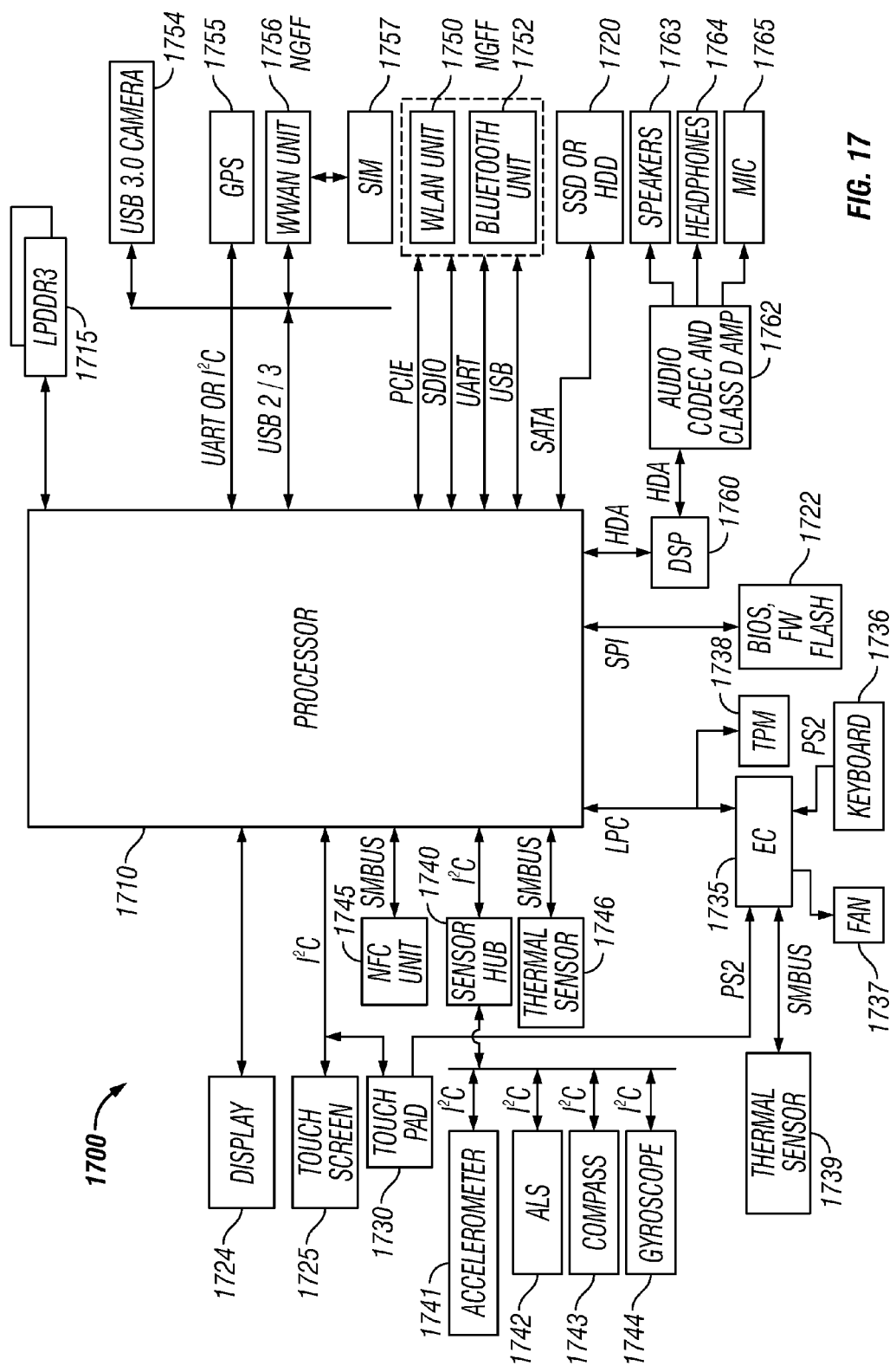
FIG. 17 is a block diagram of an electronic device for utilizing a processor, in accordance with embodiments of the present disclosure.

FIG. 17 is a block diagram of an electronic device 1700 for utilizing a processor 1710, in accordance with embodiments of the present disclosure. Electronic device 1700 may include, for example, a notebook, an ultrabook, a computer, a tower server, a rack server, a blade server, a laptop, a desktop, a tablet, a mobile device, a phone, an embedded computer, or any other suitable electronic device.

Electronic device 1700 may include processor 1710 communicatively coupled to any suitable number or kind of components, peripherals, modules, or devices. Such coupling may be accomplished by any suitable kind of bus or interface, such as I²C bus, System Management Bus (SMBus), Low Pin Count (LPC) bus, SPI, High Definition Audio (HDA) bus, Serial Advance Technology Attachment (SATA) bus, USB bus (versions 1, 2, 3), or Universal Asynchronous Receiver/Transmitter (UART) bus.

Such components may include, for example, a display 1724, a touch screen 1725, a touch pad 1730, a Near Field Communications (NFC) unit 1745, a sensor hub 1740, a thermal sensor 1746, an Express Chipset (EC) 1735, a Trusted Platform Module (TPM) 1738, BIOS/firmware/flash memory 1722, a DSP 1760, a drive 1720 such as a Solid State Disk (SSD) or a Hard Disk Drive (HDD), a wireless local area network (WLAN) unit 1750, a Bluetooth unit 1752, a Wireless Wide Area Network (WWAN) unit 1756, a Global Positioning System (GPS), a camera 1754 such as a USB 3.0 camera, or a Low Power Double Data Rate (LPDDR) memory unit 1715 implemented in, for example, the LPDDR3 standard. These components may each be implemented in any suitable manner.

Furthermore, in various embodiments other components may be communicatively coupled to processor 1710 through the components discussed above. For example, an accelerometer 1741, Ambient Light Sensor (ALS) 1742, compass 1743, and gyroscope 1744 may be communicatively coupled to sensor hub 1740. A thermal sensor 1739, fan 1737, keyboard 1746, and touch pad 1730 may be communicatively coupled to EC 1735. Speaker 1763, headphones 1764, and a microphone 1765 may be communicatively coupled to an audio unit 1764, which may in turn be communicatively coupled to DSP 1760. Audio unit 1764 may include, for example, an audio codec and a class D amplifier. A SIM card 1757 may be communicatively coupled to WWAN unit 1756. Components such as WLAN unit 1750 and Bluetooth unit 1752, as well as WWAN unit 1756 may be implemented in a Next Generation Form Factor (NGFF).

Figure 18:
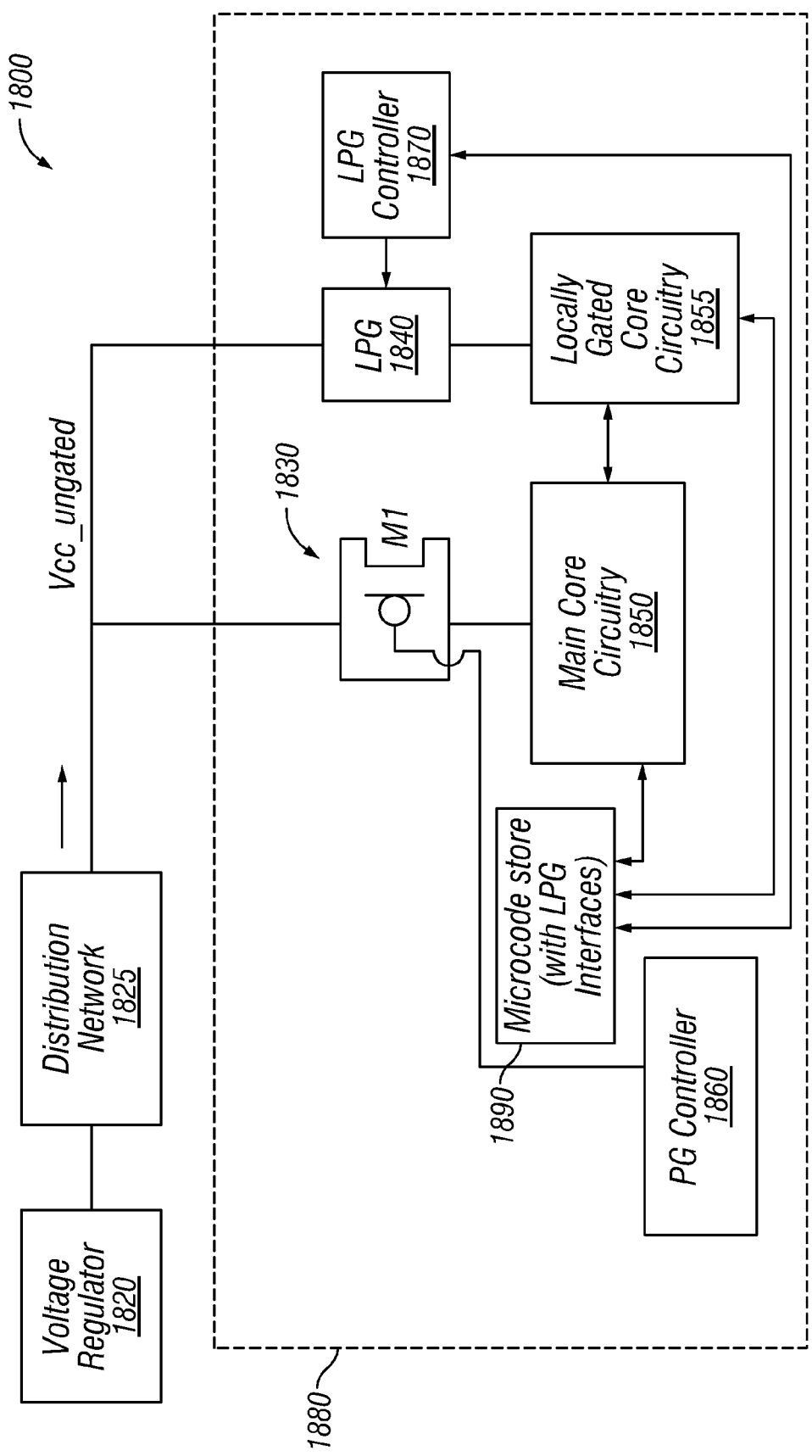
FIG. 18 is a block diagram of a portion of a power distribution system for a core including core circuitry, locally-gated core circuitry, and local power gate interfaces for power-aware operations, according to embodiments of the present disclosure.

FIG. 18 is a block diagram of a portion of a power distribution system 1800 for a core including core circuitry, locally-gated core circuitry, and local power gate (LPG) interfaces for power-aware operations, in accordance with embodiments of the present disclosure. A processor of system 1800 may include locally-gated core circuitry of a core, main core circuitry of the core, the main core comprising a decode unit and an execution unit, and LPG hardware coupled to the locally-gated core circuitry and the main core circuitry. The LPG hardware may be operative to power gate the locally-gated core circuitry according to local power states of the LPG hardware. Dynamic LPG may allow shutting the power for one or more specific domains inside a core of a processor while the core is running. More specifically, LPG may enable power to certain domains of a core to be turned on and off dynamically based on usage. LPG may turn power on and off dynamically based on usage of specific Instruction-Set-Architecture content, e.g., numeric computation or vectorized computation, in which certain regions of the core are unutilized based on software needs. For example, a 2D engine is not used in a general processing on a graphics processing unit (GPGPU) scenario. In addition, certain processor hardware is added for high performance scenarios, while some software may not utilize that hardware. One example of this situation is one or more vector execution units that operate on vector-sized data (e.g., a vector width datum including a plurality of individual data elements). However, when using LPG in a core of a processor, there may be some performance inversion for some performance-critical complicated macroinstructions (e.g., REP MOVE String, REP STORE string), as compared to conventional cores without local power gating. The embodiments described herein take advantage of a close interaction between the local power gating hardware and embodied firmware within the core (e.g., microcode) in order to save power without sacrificing the performance expected from performance-critical complicated macroinstructions (e.g., REP STORE String). In some embodiments, the LPG hardware reports its current "power-level" state to the firmware, thus allowing the firmware to select the best execution code paths optimized for minimal performance loss while maximizing power savings. The embodiments of an interface between the hardware and the firmware allows the firmware to be aware of a current local power state of the hardware, to issue hints to the local power gate hardware in order to power up the respective hardware before it is actually being needed, and to select optimal execution code paths based a current task. The following embodiments describe an implementation of rep-string flows, REP stores, as example implementations. It should be noted that other embodiments are not limited to a particular instruction set architecture, and are not limited to rep-string implementations for REP string operations.

System 1800 may include a microcode store 1890 storing microcode, which may include a layer of hardware-level instructions or data structures involved in the implementation of higher level machine code instructions in, for example, central processing units and other processors or controllers. Microcode may reside in microcode store 1890, which may be special high-speed memory, a ROM, programmable logic array (PLA), static random access memory (SRAM), flash memory, or the like. It should be noted that in some systems, all code in a device, whether microcode or machine code, might be termed as firmware. Microcode store 1890 may store microcode with the LPG interfaces.

System 1800 may be used to provide a regulated voltage to an integrated circuit such as a processor. Although the embodiments described herein are with regard to a multicore processor, understand the scope of the present invention is not limited in this regard, and other embodiments may be used in connection with other integrated circuits or other electronic devices. System 1800 may include a voltage regulator 1820. In various embodiments, voltage regulator 1820 may be an off-chip regulator that provides a regulated voltage to a distribution network 1825. Distribution network 1825 may include the circuitry such as wires, coupling elements and so forth that provide the regulated voltage (Vcc_ungated) to circuitry within the processor via one or more pins of the processor. In turn, the voltage output from distribution network 1825 may be provided through a power gate circuit 1830, which may be a core-wide power gate, also referred to as an embedded power gate (EPG). EPG 1830 may be part of a core 1880. In addition to EPG 1830, an additional power gate, referred herein as a local power gate circuit (LPG) 1840 may also present. As seen, this separate local power gate circuit may similarly receive the incoming regulated supply voltage Vcc_ungated.

Core 1880 may be arranged such that different portions of the overall core circuitry can be implemented in separate power domains. For purposes of illustration, FIG. 18 shows a first portion of main core circuitry 1850 that is present in a first power domain and that receives a supply voltage via EPG 1830 and a second portion of the core circuitry corresponding to LPG locally-gated core circuitry 1855 that in turn is of a separate power domain and receives a supply voltage via LPG 1840. Note that although a single LPG and a corresponding single power plane coupled to receive a supply voltage from this LPG is shown, the scope of the present invention is not limited in this regard and multiple such local power gate circuits and corresponding power planes can be present in other embodiments. Main core circuitry 1850 may include all portions of core circuitry other than the LPG locally-gated core circuitry 1855, which in an embodiment may correspond to a vector processing unit (VPU) or other such functional unit.

Each of first and second power gate circuits 1830 and 1840 may be implemented as one or more switching devices such as a metal oxide semiconductor field effect transistor (MOSFET) (e.g., transistor M1 shown in power gate circuit 1830). In one implementation, the MOSFETs may be P-channel MOSFETs (PMOS) although other implementations may use N-channel MOSFETs (NMOS) or other such switching devices. For example, PMOS device M1 of first power gate circuit 1830 may be gated by a control signal received from a first controller 1860 at a gate terminal of the PMOS device. Thus when enabled, the regulated voltage may be provided through power gate circuit 1830, e.g., from a source terminal to a drain terminal of MOSFET M1. The enabled switch thus provides a supply voltage. As seen, this power gate voltage may then be provided to main core circuitry 1850. Similar control of LPG 40 can be realized via LPG controller 1870 to thus provide a regulated supply voltage to LPG locally-gated core circuitry 1855 when LPG 1840 is enabled. As will be described further below, controllers 1860 and 1870 may operate to control these power gate switches based on various inputs. In general, the inputs may correspond to information regarding operating parameters of the processor, and its sub-components including activity level, various overheads, fixed values and so forth, as will be described further below.

Core 1880 may be operative to execute the microcode stored in the microcode store 1890. The microcode 1890 may include the LPG interfaces described in more detail with respect to FIG. 2. The microcode may be operative to monitor a current status of the locally-gated core circuitry. For example, the microcode can execute a dedicated micro-operation, such as select_path( ) to monitor the current status. The current status can be a LPG power state, a power level indication, or the like. The microcode might select a code path for execution when the current status allows execution of micro-operations of a first length (e.g., 16-bytes) only and a current string operation is shorter in length than a pre-defined threshold. For example, the pre-defined threshold could be 2K bytes so that if the current string operation is less than the pre-defined threshold, the microcode may decide to keep the LPG hardware in a sleep state, but power up the LPG hardware when the current string operation is greater than the pre-defined threshold. Different values for the pre-defined threshold can be used. For another example, string lengths below 2500 bytes it is better to not wake up portions of the core that are off since their wake-up latency is longer than the amount of time needed to finish the string operation using 16Byte load/store operations.

At a beginning of the code path, the microcode can initiate a first power-up sequence by the LPG hardware (e.g., LPG 1840 or LPG controller 1870) to power up the locally-gated core circuitry 1855 for execution of the micro-operations of the second length and continue execution of the micro-operations of the first length without waiting for the first power-up sequence to complete. The microcode can select another code path for execution when the current status allows execution of micro-operations of a second length (e.g., 32-bytes) only and the current string operation is shorter in length than the pre-defined threshold. At a beginning of yet another code path, the microcode can initiate a second power-up sequence by the LPG hardware (e.g., LPG 1840 or LPG controller 1870) to power up the locally-gated core circuitry 1855 for execution of the micro-operations of the third length and continue execution of the micro-operations of at least the first length or the second length without waiting for the second power-up sequence to complete. The microcode can select a code path for execution of micro-operations of a third length (e.g., 64-bytes) when the current string operation is longer in length than the pre-defined threshold.

However, in one embodiment, the microcode can select a code path for execution of micro-operations using a broadcast store operation, which may include 64-bit store micro-operations. In another embodiment, use of this code path for a broadcast store operation may obviate use of other code paths that are discussed above.

The microcode can program a jump-table register to point to the first code path with a first execution loop of the first length when the first code path is selected, program the jump-table register to point to the second code path with a second execution loop of the second length when the second code path is selected, and program the jump-table register to point to the third code path with a third execution loop of the third length when the third code path is selected. In a further embodiment, the microcode can program a jump-table register to point to the fourth code path when a command for the broadcast store is received.

The microcode can map a power level indication of the LPG hardware to a first zero-penalty, mode-based-branch (MBB) micro-operation. During operation, the microcode maps the power-level indication and the condition that the MBB checks for. The first zero-penalty, mode-based-branch micro-operation allows execution of the current string operation using the micro-operations of a specified code path. For example, when the current power level indication is at a level where 64B micro-operations can be performed, the zero-penalty mode-based-branch can include an if-then-else statement at an end of the 16B loop to check if the current power level indication has raised from 16B micro-operations allowed to 64B micro-operations allowed in order to leave the 16B loop to the 64B loop.

In another embodiment, the main core circuitry 1850 includes a decode unit and an execution unit (not shown). The LPG hardware, including LPG 1840 and LPG controller 1870, may be coupled to the LPG locally-gated core circuitry 1855 and main core circuitry 1850. The LPG hardware is operative to power gate the LPG locally-gated core circuitry 1855 according to local power states of the LPG hardware. The decode unit is operative to decode a set of instructions to perform a power-aware operation and the execution unit is to execute one or more micro-operations based on the set of instructions. The power-aware operation can be a string operation, a repeat string operation, or other complicated macroinstructions of a specified length. The "specified length" is an argument that the string-operation, e.g., REP MOVS, receives from the software, e.g., in RCX register. The value in RCX register determines whether the overall string-operation will be short, medium, or long. A first instruction of the power-aware operation can compute an execution code path for execution. For example, the main core circuitry 1850 (e.g., an execution unit of main core circuitry 1850) is operative to execute a first micro-operation to monitor a current local power state of the LPG hardware. The main core circuitry 1850 also executes a second micro-operation to select one of multiple code paths based on the current local power state, the specified length, and a specified threshold. The main core circuitry 1850 also executes a third micro-operation in the selected one of the code paths to issue a hint to the LPG hardware to power up the locally-gated circuitry 1855 and to continue execution of the first power-aware operation without waiting for the locally-gated circuitry 1855 to be powered up.

In one embodiment, the main core circuitry 1850 might not require execution of micro-operations to enable 64-bit store operations. In such an embodiment, power may already be provided to locally-gated core circuitry 1855 to enable the 64-bit operations when the code path to enable 64-bit store operations is selected In one embodiment, the power-aware operations include a repeat (REP) string operation. A REP instruction, also called "repeats," may be a string instruction that is executed the number of times specified in a count register ((E)CX) or until an indicated condition of the ZF flag is no longer met. The REP (repeat), REPE (repeat while equal), REPNE (repeat while not equal), REPZ (repeat while zero), and REPNZ (repeat while not zero) mnemonics are prefixes that can be added to one of the string instructions. The REP prefix can be added to the INS, OUTS, MOVS, LODS, and STOS instructions. It should be noted that the REP prefixes apply only to one string instruction at a time. To repeat a block of instructions, a LOOP instruction, or another looping construct, may be used. All of these repeat prefixes cause the associated instruction to be repeated until the count in register (E)CX is decremented to 0. For example, if the current address-size attribute is 32, register ECX is used as a counter, and if the address-size attribute is 16, the CX register is used. A repeating string operation can be suspended by an exception or interrupt. When this happens, the state of the registers is preserved to allow the string operation to be resumed upon a return from the exception or interrupt handler. The source and destination registers point to the next string elements to be operated on, the EIP register points to the string instruction, and the ECX register has the value it held following the last successful iteration of the instruction. This mechanism allows long string operations to proceed without affecting the interrupt response time of the system. As an example, a REP STOS instruction can be used to initialize a large block of memory quickly.

In a further embodiment, the decode unit is operative to decode instructions of the set of instructions to compute an early tail condition and the execution unit of the main core circuitry 1850 executes one or more micro-operations accordingly. Such tail conditions may be addressed as part of REP STOS values and are discussed in more detail below in conjunction with FIG. 20. For example, the main core circuitry 1850 executes a micro-operation to compute the early tail condition. The main core circuitry 1850 may subsequently apply specific store broadcast messages to match the early tail condition. Likewise, the decode unit may be operative to decode instructions of the set of instructions to compute a late tail condition and the execution unit of the main core circuitry 1850 executes one or more micro-operations accordingly. For example, the main core circuitry 1850 executes a micro-operation to compute the late tail condition. The main core circuitry 1850 may subsequently apply specific store broadcast messages to match the late tail condition.

In some implementations, there is an interconnection between the main core circuitry and the LPG locally-gated core circuitry 1855 (e.g., a functional unit that is subject to local power gating). The LPG locally-gated core circuitry 1855 may correspond to a VPU, and the main core circuitry 1850 may include other functional units of core 1880, although the scope of the present invention is not limited in this regard. Further, understand that while only a single such locally power gated circuit is shown, additional such locally power gated circuits may be present and can be implemented in one or more separate power domains than a remainder of the core circuitry. The interconnection may include an isolation circuit to logically isolate the LPG locally-gated core circuitry 1855 from the remainder of main core circuitry 1850 when it is not enabled.

System 1800 may include detection logic to detect upcoming usage of gated logic. Since power up takes time, detection logic may detect this usage as early as possible to prevent performance loss (which would typically involve stalling the machine until the unit is ready). In some implementations, this can be done at an early detection stage, or may be done speculatively by a predictor.

System 1800 may further include decision logic to control the policy of entering into a local power save state. In various implementations a timer with a watchdog or a task-based predictor can implement this detection logic. In addition, finite state machine (FSM) logic may define and control state transitions (power on/off, etc.) and notify the power monitors that power is saved.

For purposes of illustration herein, a power domain to be controlled to be selectively enabled or disabled based on usage may be a VPU. However understand that various domains can be power gated via a local power gate and power-aware operations can be executed with the LPG interfaces described herein. In one implementation a VPU may include floating point execution units (two 128 bit ports) and a register file, and thus may contribute to a large portion of core leakage. As such, embodiments may contribute to substantial total core power saving with minimal performance loss.

In some implementations, detection can be done during instruction decoding. As an example, a dedicated decode unit may detect VPU instructions or memory instructions using a VPU register. When detected, the decode unit can signal the LPG controller, which turns the power on and unlocks isolation between this gated circuitry and a remainder of the core circuitry. In some implementations, the controller will stall the machine if the instruction passes the instruction queue and the VPU is not yet powered up. When exiting the LC6 state, the controller may also reset the logic and send an interrupt to an agent that in turn restores the contents of the VPU registers. In one implementation, this agent may be low-level system software or firmware (such as code morphing software (CMS)). Note however that the ability to take interrupts and save/restore register state could be part of any low level software. For a simple form of LPG that uses a hardware timer to enter low power states and that powers back up on demand, such low level software, can service these interrupts. In some implementations, providing a dynamic binary translator allows a more sophisticated mechanism for learning and predicting when a given resource can be power gated in an eager manner with maximum efficiency. Note that an alternative detection method may be a power on hint provided by CMS. The hint can be provided early enough so exiting the save state will not stall the machine.

The detection logic may also identify when the pipeline is free of VPU instructions. Unlike most instructions that complete after a known number of cycles, a memory instruction may have unpredictable latency. In case of load of a VPU register with a cache miss, the memory logic (such as a miss tracker in the memory ordering system) may continue to keep signaling the LPG controller that a VPU load is in process to avoid turning off the logic before the load completes and writes to the register.

Figure 19:
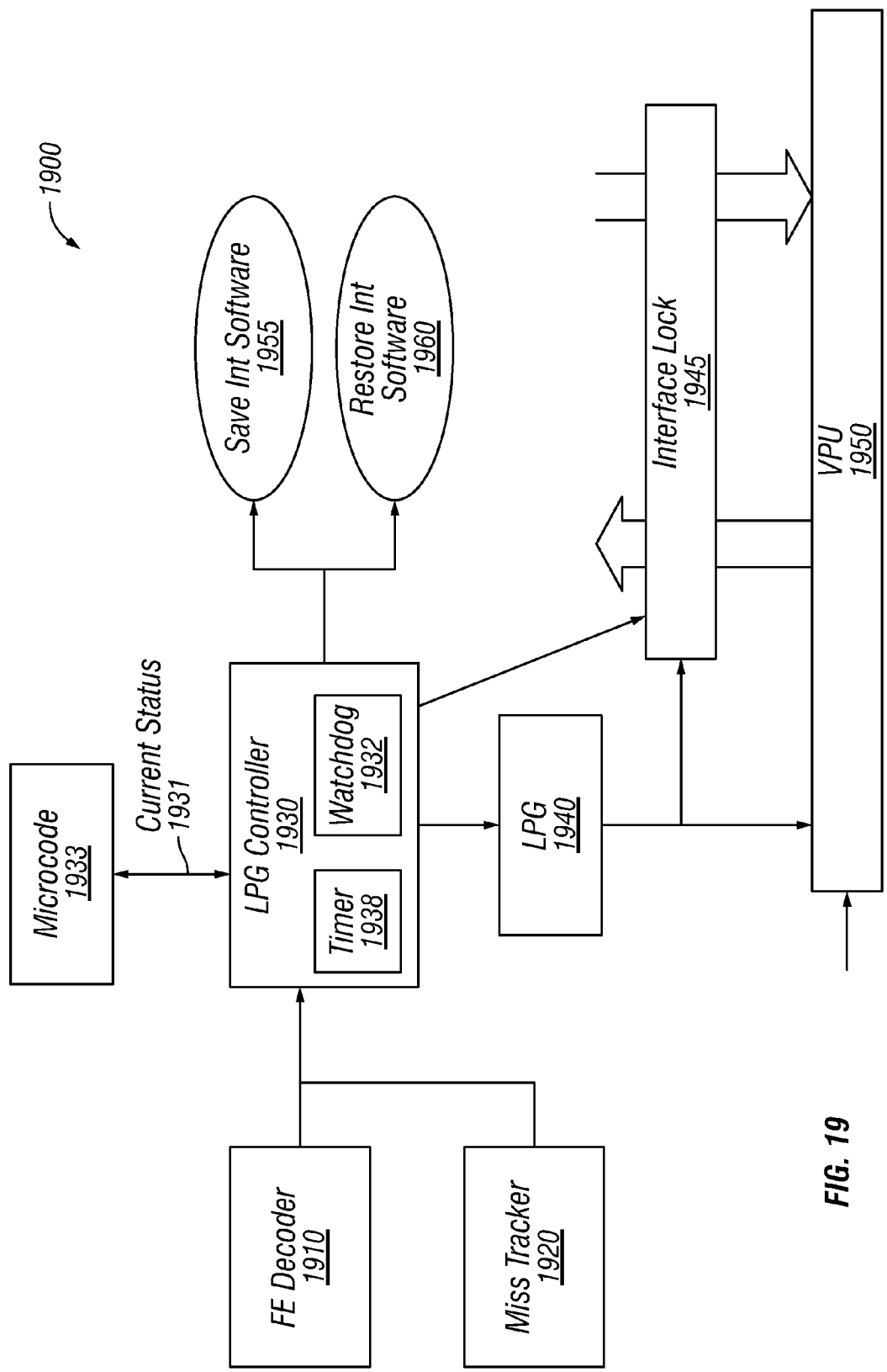
FIG. 19 is a block diagram of power gating for power-aware operations, accordance with embodiments of the present disclosure.

FIG. 19 is a block diagram of power gating for power-aware operations, in accordance with embodiments of the present invention. A processor 1900 as shown in FIG. 19 can include various elements. For ease of illustration, only components involved in performing LPG operations are shown. Gating of a VPU 1950 may include various components for performing single instruction, multiple data (SIMD) operations, or the like, including registers, execution units, control logic and so forth. VPU 1950 may be powered on when an LPG 1940 is enabled to provide power to the unit. Otherwise, VPU 1950 may be powered off and can be isolated from other circuitry of a core via an interface lock 1945, which may provide logic isolation.

LPG control can be by way of an LPG controller 1930 that includes a timer 1935. In one embodiment, a pure hardware approach is provided to power gate VPU 150 depending on whether VPU instructions are present in the machine. Specifically a front end decoder 1910 may receive incoming instructions and decode them. When a vector-based instruction is decoded in decoder 1910, an indication signal can be sent to controller 1930 to thus indicate the presence of this vector instruction in the machine. When this indication is received in LPG controller 1930, the timer may be reset to an initial value. In an embodiment, timer 1935 may be configured as a countdown timer that counts from its initial value down to a zero value. When the zero value is reached, indicating a lack of a vector instruction for a certain length of time (e.g., as measured in cycles) LPG controller 1930 may trigger power gate circuitry 1940 to trigger to thus cause VPU 1950 to enter into a given local low power state.

Furthermore, processor 1900 may include a miss tracker 1920. This tracker may maintain track of pending memory operations that implicate vector data and which are in flight (that is, a memory request has not yet been fulfilled). The presence of entries in this tracker may similarly cause an indication signal to be sent to LPG controller 1930 to similarly cause timer 1935 to be reset and may be released from reset only when the miss tracker is cleared. While shown with these specific detection logics, understand the scope of the present invention is not limited in this regard.

LPG controller 1930, in addition to controlling LPG 1940, may further provide control signals to various interrupt handlers. An interrupt handler 1955 may be a state save interrupt handler, which can be generated by hardware to cause the software to save the state present in VPU 1950 prior to entry into a deep low power state (e.g., LC6). Similarly, when LPG controller 1930 is to cause LPG 1940 to return from the deep low power state provide power to thus power on VPU 1950, controller 130 may send a control signal to a second interrupt handler, namely a restore interrupt handler 1960, which then may cause software to restore previously saved state for the VPU when it is again powered up.

LPG controller 1930 may track a current status 1931 of the LPG 1940, such as a current power level, a current power state or the like. Microcode 1933 can monitor current status 1931 of LPG 1940 in order to select an appropriate code path, to issue hints to LPG 1940 to power up in some cases, and potentially to determine when to jump to another code path when certain power conditions are met during execution. Furthermore, microcode 1933 may set LPG 1940 to maintain power to 64-bit store operations.

Decision logic of the LPG controller may be implemented in alternate algorithms. For example, a pure hardware approach or a hardware/software co-design approach could be used. In an embodiment, the pure hardware approach contains a timer and a watchdog 1932 as just described. The timer counts down when no VPU instructions are in the pipeline and is reset to its initial value if a VPU instruction is in the pipeline. When the timer expires, the LPG can transient to a save state. In an embodiment there can be two controls: one for LC3 and one for LC6, each with different timer values and actions. The watchdog role is to adjust the timer value to limit performance loss on the one hand while gaining more power on the other. In an embodiment, parameters to be considered may include a maximum allowable performance loss and watchdog responsiveness (via an averaging interval).

Embodiments can be applied to any dynamic binary translation (DBT) system, such as a hardware/software co-designed processor. In such a processor, software is executed by translating it at the basic-block level into code of a native instruction set. This translation is performed by a software layer, which executes on the core itself. The software layer is therefore a dynamic binary translator. An analogous situation is that of a Java just-in-time compiler, which translates Java bytecode into native binary code understood by the underlying machine.

In such embodiments, the binary translator can perform predictions and instruct hardware when to enter and exit LPG states. One embodiment of this prediction is by means of event tracker hardware. Another embodiment is by means of static and/or dynamic analysis of the program to determine regions of code that do not require a given resource.

Some embodiments can be implemented in a hardware/software co-design processor that provides for optimization of received code for the processor and can leverage knowledge of the units used in execution of such code to permit aggressive local power gating in accordance with an embodiment of the present invention.

Figure 20:
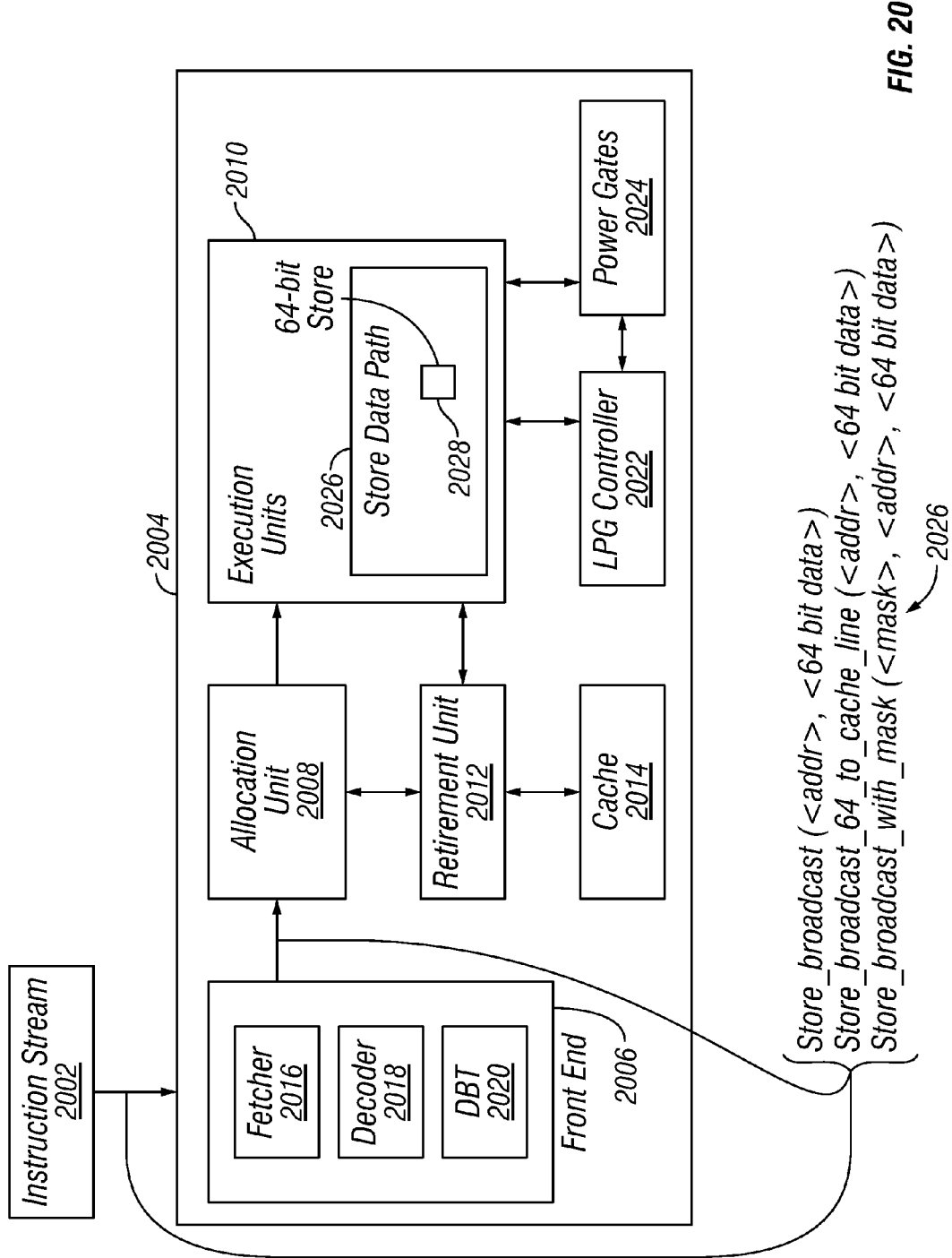
FIG. 20 illustrates an example of a system for implementing an instruction and logic for a store broadcast, in accordance with embodiments of the present disclosure.

FIG. 20 illustrates an example of a system 2000 for implementing an instruction and logic for a store broadcast, in accordance with embodiments of the present disclosure. System 2000 may include a processor 2004 to execute instructions such as those in instruction stream 2002. Processor 2004 may selectively power-on and power-off various execution entities within processor 2004, depending upon instructions that are being executed and dynamic needs. Processor 2004 may utilize LPG to power-on and power-off the execution entities. In another embodiment, processor 2004 may determine that, for certain operations such as store operations, many portions of processor 2004 may be powered down and yet still reach peak store bandwidth. In yet another embodiment, processor 2004 may determine that, in order to maintain peak store bandwidth, power need only be maintained to execution portions of processor 2004 for integer operations. In still yet another embodiment, processor 2004 may determine that, in order to maintain peak store bandwidth, power need only be maintained to execution portions of processor 2004 for 64-bit integer operations. In another embodiment, processor 2004 may determine that, in order to maintain peak store bandwidth, a specific store operation that takes advantage of such minimally powered-up sections of processor 2004 may yet achieve peak store bandwidth. In yet another embodiment, processor 2004 may determine that, in order to maintain peak store bandwidth, only memory sub-systems needed to handle full cache line store operations are might be needed to achieve peak store bandwidth.

Any suitable instructions may be used to specify store broadcast instructions that take advantage of LPG power-down operations. The width of the instructions may be related to the size of cache lines in processor 2004. For example, if processor 2004 includes 64-byte cache lines, then the store broadcast instructions may be 64-bytes. Accordingly, processor 2004 may maintain power to datapaths for 64-bit integer or 64-bit store operations in order to maintain peak store bandwidth, even while other portions of processor 2004 are powered down. Moreover, schemes utilizing a staged powering-up of datapaths smaller than the size of cache lines might be less efficient than the ability of processor 2004 to execute store broadcast operations matching the size of the cache lines.

In one embodiment, processor 2004 may accept, generate, or otherwise utilize instructions 2026 for store broadcast. Example embodiments of store instructions 2026 are illustrated, but any suitable instruction may be used. Store instructions 2026 may broadcast data directly to a store cache line. For example, store instructions 2026 may illustrate example embodiments if the cache line size of processor 2004 is 64 bytes. However, if the cache line size of processor 2004 was different, other sizes of store instructions 2026 might be used. Instructions 2026 may be included in instruction stream 2002 as received at processor 2004 for execution, or may be generated internally by processor 2002 in response to instructions within instruction stream 2002. For example, instructions 2026 may include a general instruction "store_broadcast" which accepts as its operands an address and data. The certain number of bits accepted as data may depend upon the cache line of processor 2004. "Store_broadcast" may in turn be translated or converted to a more specific function call that explicitly specifies a number of bits that will be broadcast, such as "store_broadcast_64." Furthermore, "store_broadcast_64" might be called directly, without use of "store_broadcast." In addition, instructions 2026 may include store operations that mask part of their output. For example, instructions 2026 may include "store_broadcast_with_mask."

As discussed above, store instructions 2026 may implement other operations. Processor 2004 may recognize the ability to selectively use store instructions 2026 in combination with powering-down operations, given a powered-down state and translatable instructions in instruction stream 2002. For example, instruction stream 2002 may include a macroinstruction such as REP STOS. REP STOS may include a repeated number of store operations. If many elements of processor 2004 are powered-down with LPG, processor 2004 may selectively implement REP STOS with store instructions 2026 and powering on only a small subset of the elements within processor 2004. In such an example, only the memory sub-system needed to perform integer stores needs to be activated with LPG to carry out REP STOS by using store instructions 2026.

REP STOS and other macroinstructions such as REP MOVS may be power-aware. However, executing REP STOS or other instructions in a power-aware manner may require selective activation of various code paths. Such selection of various code paths may incur latency. In one embodiment, processor 2004 may selectively power-on with LPG only those portions necessary to execute store instructions 2026 and convert the REP STOS instruction to a series of calls to store instructions 2026. Furthermore, REP STOS instructions may be performed without powering on additional circuitry by LPG, as such sufficient circuitry may be powered on at all times. By doing so, processor 2004 may decrease latency of execution of REP STOS wherein the REP STOS is made without consideration to power. In another embodiment, processor 2004 may execute instructions such as REP STOS through use of store instructions 2026 without dependence upon any particular state of LPG in processor 2024. Thus, processor 2004 may execute instructions such as REP STOS through use of store instructions 2026 when facilities for 16-byte and 32-byte operations are powered-down.

A REP STOS instruction may be a write of string values of arbitrary length. Accordingly, processor 2004 may translate a REP STOS instruction to a looping execution of store instructions 2026, wherein multiple instances of a given store instruction may be executed to fully carry out the REP STOS. In one embodiment, store instructions 2026 may be of a fixed length. Thus, application of store instructions 2026 of such a fixed length (such as 64 bits, corresponding to the size of cache lines of processor 2004) to an arbitrary length of the REP STOS values may leave a "tail" or "trailing values" that may be addressed by mask commands. In another embodiment, "store_broadcast_with_mask" may be used to selectively store only the "tail" or "trailing values" leftover from the REP STOS after repeated use of other "store_broadcast" instructions. In yet another embodiment, "store_broadcast_with_mask" may be used to selectively store a prolog of data of the REP STOS instruction in order to align with a cache line. In such an embodiment, "store_broadcast_with_mask" may be followed by repeated execution of other "store_broadcast" instructions.

Processor 2004 may be implemented in-part by any suitable combination of elements of FIGS. 1-19. For example, processor 2004 may include a front end 2006, allocator 2008, retirement unit 2012, and one or more execution units 2010. Furthermore, processor 2004 may include one or more processing cores (not shown) in which these elements may be implemented. In addition, processor 2004 may include suitable destinations for data, including registers, memory, or cache 2014.

Front end 2006 may fetch instructions to be executed and prepare the instructions to be executed later in the execution pipeline. Front end 2006 may include prefetchers and fetchers 2016, just-in-time compilers, translators such as dynamic binary translator 2020, and decoders such as decoder 2018. Decoder 2018 may decode or interpret instructions from instruction stream 2002 into uops that processor 2004 may execute. Decoder 2004 may parse the instruction into an opcode and corresponding data and control fields for execution. Furthermore, dynamic binary translator 2020 may translate instructions in instruction stream 2002 and provide them to decoder 2018, or may translate instructions after they have been decoded by decoder 2018.

In one embodiment, dynamic binary translator 2020 may modify instructions to take advantage of using store instructions 2026. In another embodiment, store instructions 2026 may already be provided within instruction stream 2002 by, for example, a user, programmer, or compiler. Furthermore, LPG instructions to selectively activate the limited portions of processor 2004 to execute store instructions 2026 may be decoded or translated.

Instructions may be passed from front end 2006 to allocator 2008. Allocator 2008 may allocate and schedule resources for out-of-order execution of the instructions received from front end 2006. The execution of particular instructions to a given execution unit 2010 may be assigned and the instruction may be dispatched. Retirement unit 2012 may reclaim resources associated with out-of-order execution. Results of operations may be stored in, for example, cache 2014.

In one embodiment, processor 2004 may include LPG controller 2022 and power gates 2024 to selectively power-on and power-off portions of execution units 2010 in response to instructions received. For example, a power-aware instruction may cause LPG controller 2022 and power gates 2024 to power-up a least-expensive path in execution units 2010 to execute the instruction. In another example, LPG controller 2022 and power gates 2024 may power-up a sequence or chain of portions of execution units 2010 to support such power-aware instruction, power-up portions of execution units 2010 in response to dynamic needs, and power-down unused portions of execution units. In another embodiment, LPG controller 2022 and power gates 2024 power-up hardware of execution units 2010 sufficient for integer store operations in response to pending execution of store instructions 2026. In yet another embodiment, LPG controller 2022 and power gates 2024 may constantly keep power to hardware of execution units 2010 sufficient for integer store operations. The portions of execution units 2010 which are powered for use by store instructions 2026 may include integer instructions matching the size of cache lines of processor 2004.

Execution units 2010 may include a store datapath 2026, which may include hardware to support store instructions 2026. For example, a 64-bit store operation may be implemented by store datapath 2026. In response to pending store instructions 2026, LPG controller 2022 may cause power gates 2024 to power-up 64-bit store 2028.

In various embodiments, LPG controller 2022 and power gates 2024 may provide power-on gating for store datapath 2026 by providing power to datapaths for executing integer instruction set architecture operations. Furthermore, LPG controller 2022 and power gates 2024 might only need to provide power to a memory subsystem of processor 2004 such that the memory subsystem can handle full cache-line store operations. Moreover, during looping operations of store broadcast functions, LPG controller 2022 and power gates 2024 may maintain power configurations to other portions of processor 2004, as such execution of the store broadcast functions might not require additional datapaths to be powered-up. In addition, execution of store broadcast functions may be made independently of portions of processor 2004 that are powered down. In contrast, power-aware functions may be executed based upon determinations of what portions of processor 2004 that are powered down.

The store broadcast functions and power-aware functions may be executed within the same environment of processor 2004.

FIG. 21 is an illustration of example operation of system 2000 to execute store operations, in accordance with embodiments of the present disclosure. For example, upon receipt of a REP STOS instruction that is to store N bits of data, such as a string, to an address ADDR1, processor 2004 may break down the instruction into multiple calls of store instructions 2026. The N bits of data may be included in DATA. In another example, upon receipt of a "store_broadcast" instruction that is to store a string or other data structure DATA to an address ADDR1, processor 2004 may break down the instruction into multiple calls of others of store instructions 2026. In yet another example, "store_broadcast" itself may be part of the translation of the REP STOS. In one embodiment, store instructions 2026 will be executed a certain number of times according to the size of the bits addressed therein. For example, a string of 128 bits would require two executions of 64-bit versions of store broadcast instructions.

The following example operations may be based on conditions that DATA includes N bits and that the number N of bits is a multiple x of sixty-four plus an additional amount y. This example operation may also be based on processor 2004 have a 64-byte cache line. If processor 2004 were to have a differently sized cache line, then store instructions 2026 may be of a different size and the number of N bits may be considered a multiple of the different size. For example, if store instructions 2026 were of a 128-bit width, the number of N bits would be considered a multiple z of one-hundred twenty-eight.

In one embodiment, a store broadcast instruction may be executed x times such that portions of DATA may be sent to cache lines. In another embodiment, a store broadcast instruction with a mask may be executed to store the remaining portions of DATA that were leftover after the x executions of the store broadcast instruction. For example, at (1), "store_broadcast_64_to_cache line" may be called to send the first sixty-four bits of DATA to ADDR1. At (2), "store_broadcast_64_to_cache_line" may be called again to send the next sixty-four bits of DATA to ADDR1. The call to "store_broadcast_64_to_cache_line" may be repeated until there are less than sixty-four bits of DATA remaining to be sent to ADDR1. This may include repeating the call to "store_broadcast_64_to_cache_line" x times. Thus, operation of processor 2004 may include looping operation of the 64-bit store broadcast function. On the next iteration, processor 2004 may make a call to "store_broadcast_with_mask" to send the remaining portions of DATA to ADDR1. A mask parameter may be formed by creating a constant with values of "one" matching the positions of the remaining elements of DATA and values of "zero" for all other positions within a sixty-four bit wide buffer. Thus, the trailing bits of DATA that have not yet been stored to the cache line may be selectively sent to the cache line, where the mask is used to make the selections.

Figure 22:
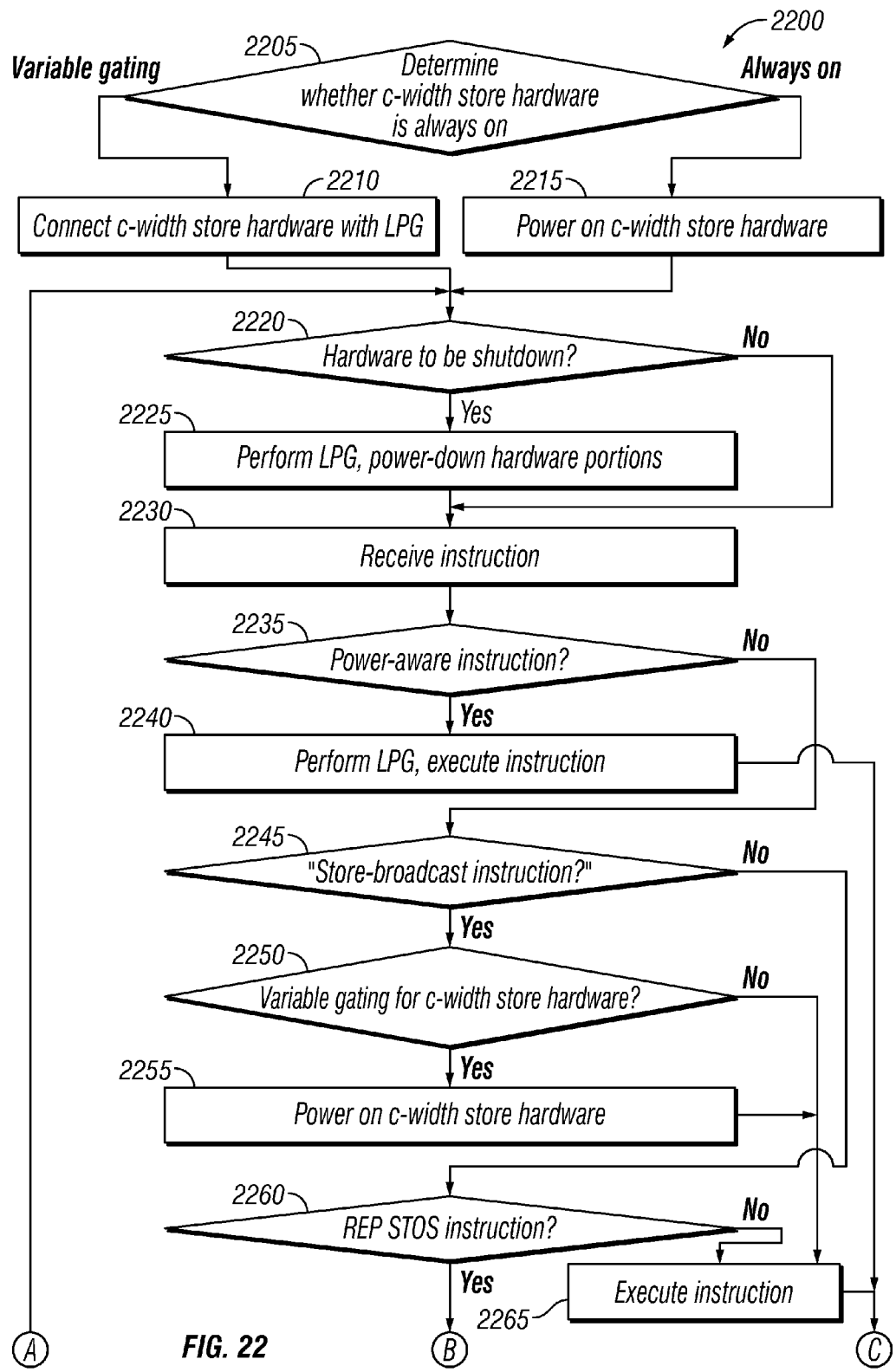
FIG. 22 is an illustration of an example method for broadcast store operations, in accordance with embodiments of the present disclosure.
Figure 22:
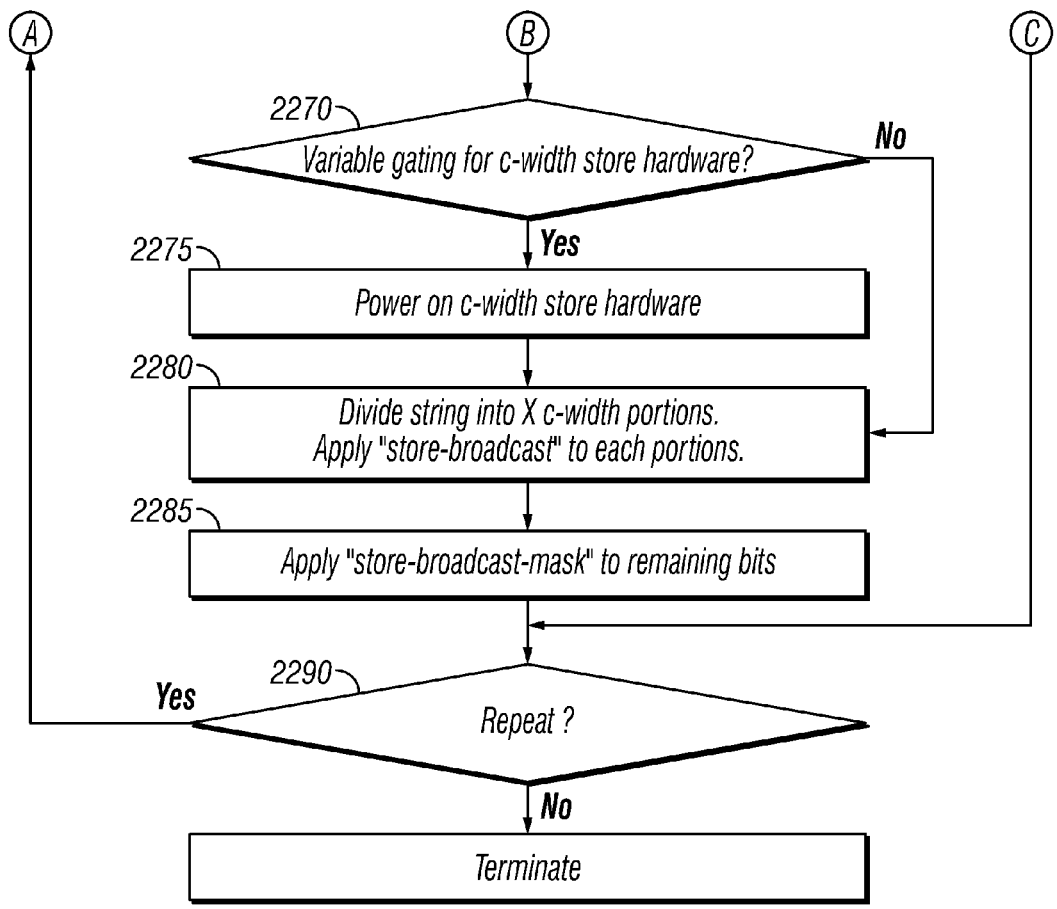

FIG. 22 is an illustration of an example method 2200 for broadcast store operations, in accordance with embodiments of the present disclosure. Method 2200 may begin at any suitable point and may execute in any suitable order. In one embodiment, method 2200 may begin at 2205. In various embodiments, method 2200 may be performed during the execution of a processor such as processor 2004. Moreover, method 2200 may performed by any suitable combination of the elements of processor 2004 or other elements. Such elements may include, for example, front end 2006, LPG controller 2022, power gates 2024, store datapath 2026, or 64-bit store 2028.

At 2205, it may be determined whether store hardware for supporting broadcast stores will always be on. In one embodiment, the store hardware considered may include hardware for executing store operations of a width (c-width) matching the cache line of processor 2004. For example, it may be determined, for processor 2004 having a cache line with sixty-four bytes, whether store hardware servicing instruction set architecture instructions of sixty-four bits will always be on. In another embodiment, it may be determined whether the store hardware in question will always be on, or whether the store hardware may be selectively and variably gated for power using LPG. Variable gating of power may include conditions wherein the store hardware may be powered up and powered down. If store hardware may be variably gated, method 2200 may proceed to 2210. If store hardware is to remain always on, method 2200 may proceed to 2215.

At 2210, the store hardware may be connected with LPG entities such as LPG controller 2022 and power gates 2024 so that power to the store hardware may be selectively made based upon determined conditions. At 2215, the store hardware may be powered up.

At 2220, it may be determined whether various portions of processor 2004 are to be shut down. The determination may be based upon use, non-use, throttling, throughput, timers, retirement of instructions or any other suitable conditions. If portions of processor are to be shut down, then method 2200 may proceed to 2225. Otherwise, method 2200 may proceed to 2230. At 2225, LPG may be applied to hardware that is to be shut down. A power-down sequence may be applied to the hardware.

At 2230, an instruction for execution may be received at, for example, front end 2006. The instruction may be decoded. Moreover, the instruction may be translated into additional instructions.

At 2235, it may be determined whether the instruction is power-aware instruction. Such an instruction may include, for example, an instruction that is selectively executed within execution units of processor 2004 on code paths that are optimized or selected to balance performance loss and power savings. For example, the instruction may be transformed to take advantage of powered-on datapaths not matching the original instruction, rather than powering-on datapaths that more closely match the instruction. If the instruction is power-aware, method 2200 may proceed to 2240. Otherwise, method 2200 may proceed to 2245. At 2240, LPG may be applied according to the code path specified by the instruction, taking into account the intended result of the instruction and the power status of various datapaths of processor 2004. The instruction may be executed. Method 2200 may proceed to 2290.

At 2245, it may be determined whether the instruction is a "store-broadcast" instruction, or a variant of a "store-broadcast" function. If the instruction is a "store-broadcast" function, method 2200 may proceed to 2250. If the instruction is not a "store-broadcast" function, method 2200 may proceed to 2260.

At 2250, it may be determined whether variable power gating has been enabled for the store hardware of the width matching the cache lines of processor 2004. Such enablement may have been determined, for example at 2205. If variable gating has not been enabled, it may be presumed that power is constantly on for such store hardware and method 2200 may proceed to 2265. If variable gating has been enabled, at 2255 a power-up sequence may be issued by LPG controller 2022 and power gates 2024 to provide power for datapaths to execute the store broadcast instruction. The power may be maintained at least long enough to execute the store broadcast instruction and any similar instructions immediately following. Method 2200 may proceed to 2265.

At 2260, it may be determined whether the instruction is a REP STOS instruction, or any other instruction that includes store broadcast operations being repeated. If so, method 2200 may proceed to 2270. If not, method 2200 may proceed to 2265.

At 2265, the instruction may be executed. Method 2200 may proceed to 2290.

At 2270, it may be determined whether variable power gating has been enabled for the store hardware of the width matching the cache lines of processor 2004. Such enablement may have been determined, for example at 2205. If variable gating has not been enabled, it may be presumed that power is constantly on for such store hardware and method 2200 may proceed to 2280. If variable gating has been enabled, at 2270 a power-up sequence may be issued by LPG controller 2022 and power gates 2024 to provide power for datapaths to execute the store broadcast instruction. The power may be maintained at least long enough to execute the REP STOS instruction and any similar instructions immediately following.

At 2280, the data to be stored by the instruction, such as a string, may be divided into portions, wherein each portion is the size of the width of store broadcast instructions. The instruction may be thus implemented by multiple calls to other instructions. For example, REP STOS may be implemented by first calling "store-broadcast" x number of times. Each time "store-broadcast" is executed, another portion may be stored to a cache line. The pending data may be reduced by the size of the "store-broadcast" instruction.

At 2285, any remaining data to be stored by the instructions, which may be insufficient to require an entire, full buffer of "store-broadcast", may be stored to the cache line by applying a "store-broadcast-mask" instruction. A mask for the instruction may be specified such that the remaining data is stored, while additional, unused positions within such a buffer are ignored.

At 2290, it may be determined whether to repeat. If so, method 2200 may return to 2220. If not, method 2200 may terminate.

Method 2200 may be initiated by any suitable criteria. Furthermore, although method 2200 describes an operation of particular elements, method 2200 may be performed by any suitable combination or type of elements. For example, method 2200 may be implemented by the elements illustrated in FIGS. 1-21 or any other system operable to implement method 2200. As such, the preferred initialization point for method 2200 and the order of the elements comprising method 2200 may depend on the implementation chosen. In some embodiments, some elements may be optionally omitted, reorganized, repeated, or combined.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system may include any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine-readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, Compact Disk Read-Only Memories (CD-ROMs), Compact Disk Rewritables (CD-RWs), and magneto-optical disks, semiconductor devices such as Read-Only Memories (ROMs), Random Access Memories (RAMs) such as Dynamic Random Access Memories (DRAMs), Static Random Access Memories (SRAMs), Erasable Programmable Read-Only Memories (EPROMs), flash memories, Electrically Erasable Programmable Read-Only Memories (EEPROMs), magnetic or optical cards, or any other type of media suitable for storing electronic instructions.

Accordingly, embodiments of the disclosure may also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part-on and part-off processor.

Thus, techniques for performing one or more instructions according to at least one embodiment are disclosed. While certain exemplary embodiments have been described and shown in the accompanying drawings, it is to be understood that such embodiments are merely illustrative of and not restrictive on other embodiments, and that such embodiments not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor, comprising:
a core including locally-gated circuitry;
a decode unit including circuitry to decode a store broadcast instruction of a specified width;
a local power gate (LPG) coupled to the locally gated circuitry and including circuitry to:
selectively provide power to the locally-gated circuitry;
activate power to a first portion of the locally-gated circuitry for execution of full cache-line memory operations;
deactivate power to a second portion of the locally-gated circuitry; and
an execution unit including circuitry to execute, by the first portion of the locally-gated circuitry for execution of full cache-line memory operations, the store broadcast instruction, the store broadcast instruction to store data of the specified width to storage of the processor.

2. The processor of claim 1, wherein:
the store broadcast instruction is included in a REP STOS instruction;
the execution unit further includes circuitry to repeatedly execute the store broadcast instruction to fulfill the REP STOS instruction; and
the LPG further includes circuitry to maintain power configurations during the repeated execution of the store broadcast instruction.

3. The processor of claim 1, wherein:
the decode unit further includes circuitry to decode a masked store broadcast instruction of the specified width; and
the execution unit further includes circuitry to execute the masked store broadcast instruction to selectively store data remaining from execution of the store broadcast instruction.

4. The processor of claim 1, wherein:
the decode unit further includes circuitry to decode a masked store broadcast instruction of the specified width; and
the execution unit further includes circuitry to execute the masked store broadcast instruction to selectively store data before execution of the store broadcast instruction, the store broadcast instruction aligned with a cache line after execution of the masked store broadcast instruction.

5. The processor of claim 1, wherein:
the specified width of the store broadcast instruction matches a cache line size of the processor; and
the LPG further includes circuitry to activate power to the first portion of the locally-gated circuitry for execution of full cache-line memory operations based upon the specified width of the store broadcast instruction.

6. The processor of claim 1, wherein:
the decode unit further includes circuitry to decode a power-aware instruction;
the execution unit further includes circuitry to selectively execute the power-aware instruction based upon determinations of unpowered portions of locally-gated circuitry; and
and the execution unit further includes circuitry to execute the store broadcast instruction independently of determinations of unpowered portions of locally-gated circuitry.

7. The processor of claim 1, wherein the LPG further includes circuitry to activate power to the first portion of the locally-gated circuitry based upon the decoded store broadcast instruction.

8. A method comprising, within a processor:
decoding a store broadcast instruction of a specified width;
selectively providing power with a local power gate (LPG) locally gated circuitry of the processor;
activating power to a first portion of the locally-gated circuitry for execution of full cache-line memory operations;
deactivating power to a second portion of the locally-gated circuitry; and
executing, by the first portion of the locally-gated circuitry for execution of full cache-line memory operations, the store broadcast instruction to store data of the specified width to storage of the processor.

9. The method of claim 8, wherein:
the store broadcast instruction is included in a REP STOS instruction;
the method further comprises:
repeatedly executing the store broadcast instruction to fulfill the REP STOS instruction; and
maintaining power configurations during the repeated execution of the store broadcast instruction.

10. The method of claim 8 further comprising:
decoding a masked store broadcast instruction of the specified width; and
executing the masked store broadcast instruction to selectively store data remaining from execution of the store broadcast instruction.

11. The method of claim 8, further comprising:
decoding a masked store broadcast instruction of the specified width; and
executing the masked store broadcast instruction to selectively store data before execution of the store broadcast instruction, the store broadcast instruction aligned with a cache line after execution of the masked store broadcast instruction.

12. The method of claim 8, wherein:
the specified width of the store broadcast instruction matches a cache line size of the processor; and
the method further comprises activating power to the first portion of the locally-gated circuitry for execution of full cache-line memory operations based upon the specified width of the store broadcast instruction.

13. The method of claim 8, further comprising:
decoding a power-aware instruction;
selectively executing the power-aware instruction based upon determinations of unpowered portions of locally-gated circuitry; and
executing the store broadcast instruction independently of determinations of unpowered portions of locally-gated circuitry.

14. A system comprising:
a processor including a core, the core including locally-gated circuitry;
a decode unit including circuitry to decode a store broadcast instruction of a specified width;
a local power gate (LPG) coupled to the locally gated circuitry and including circuitry to:
selectively provide power to the locally-gated circuitry;

activate power to a first portion of the locally-gated circuitry for execution of full cache-line memory operations;

deactivate power to a second portion of the locally-gated circuitry; and an execution unit including circuitry to execute, by the first portion of the locally-gated circuitry for execution of full cache-line memory operations, the store broadcast instruction, the store broadcast instruction to store data of the specified width to storage of the processor.

15. The system of claim 14, wherein:

the store broadcast instruction is included in a REP STOS instruction;

the execution unit further includes circuitry to repeatedly execute the store broadcast instruction to fulfill the REP STOS instruction; and the LPG further includes circuitry to maintain power configurations during the repeated execution of the store broadcast instruction.

16. The system of claim 14, wherein:

the decode unit further includes circuitry to decode a masked store broadcast instruction of the specified width; and the execution unit further includes circuitry to execute the masked store broadcast instruction to selectively store data remaining from execution of the store broadcast instruction.

17. The system of claim 14, wherein:

the decode unit further includes circuitry to decode a masked store broadcast instruction of the specified width; and the execution unit further includes circuitry to execute the masked store broadcast instruction to selectively store data before execution of the store broadcast instruction, the store broadcast instruction aligned with a cache line after execution of the masked store broadcast instruction.

18. The system of claim 14, wherein:

the specified width of the store broadcast instruction matches a cache line size of the processor; and the LPG further includes circuitry to activate power to the first portion of the locally-gated circuitry for execution of full cache-line memory operations based upon the specified width of the store broadcast instruction.

19. The system of claim 14, wherein:

the decode unit further includes circuitry to decode a power-aware instruction;

the execution unit further includes circuitry to selectively execute the power-aware instruction based upon determinations of unpowered portions of locally-gated circuitry; and and the execution unit further includes circuitry to execute the store broadcast instruction independently of determinations of unpowered portions of locally-gated circuitry.

20. The system of claim 14, wherein the LPG further includes circuitry to activate power to the first portion of the locally-gated circuitry based upon the decoded store broadcast instruction.

* * * * *